(12) United States Patent
Morimoto et al.

(10) Patent No.: US 12,157,640 B2
(45) Date of Patent: Dec. 3, 2024

(54) MIXING DEVICE

(71) Applicant: JDC Corporation, Tokyo (JP)

(72) Inventors: Hidetoshi Morimoto, Tokyo (JP); Yuu Sato, Tokyo (JP); Shingo Mizutani, Tokyo (JP)

(73) Assignee: JDC Corporation, Tokyo (JP)

( * ) Notice: Subject to any disclaimer, the term of this patent is extended or adjusted under 35 U.S.C. 154(b) by 115 days.

(21) Appl. No.: 18/009,674

(22) PCT Filed: May 17, 2021

(86) PCT No.: PCT/JP2021/018578
§ 371 (c)(1),
(2) Date: Dec. 9, 2022

(87) PCT Pub. No.: WO2021/251066
PCT Pub. Date: Dec. 16, 2021

(65) Prior Publication Data
US 2023/0227266 A1     Jul. 20, 2023

(30) Foreign Application Priority Data

Jun. 11, 2020     (JP) ................. 2020-101607

(51) Int. Cl.
*B65G 41/00*     (2006.01)
*B01F 35/71*     (2022.01)
*G05D 3/12*     (2006.01)

(52) U.S. Cl.
CPC .......... *B65G 41/008* (2013.01); *B01F 35/716* (2022.01); *G05D 3/12* (2013.01)

(58) Field of Classification Search
None
See application file for complete search history.

(56) References Cited

U.S. PATENT DOCUMENTS

| 8,721,254 B1* | 5/2014 | Kuhns | B65G 57/28 |
| | | | 414/789.2 |
| 11,321,548 B2* | 5/2022 | Winkler | B65G 1/1373 |
| 2017/0175363 A1 | 6/2017 | Clarke | |
| 2017/0280048 A1 | 9/2017 | Takahashi et al. | |
| 2019/0016569 A1 | 1/2019 | Palberg et al. | |
| 2022/0076192 A1* | 3/2022 | Lee | G06K 7/10366 |

FOREIGN PATENT DOCUMENTS

| GB | 2478150 A | 8/2011 |
| JP | H07-124457 A | 5/1995 |
| JP | 2001-254392 A | 9/2001 |
| JP | 2002-211736 A | 7/2002 |

(Continued)

OTHER PUBLICATIONS

International Search Report in PCT/JP2021/018578 and its English translation, mailed Jul. 20, 2021, 6 pgs.

*Primary Examiner* — Kavel Singh
(74) *Attorney, Agent, or Firm* — Young Basile Hanlon & MacFarlane, P.C.

(57) ABSTRACT

A positioning method for positioning a first device and a second device separated from the first device is described. The second device is moved so as to approach the first device, a first mark on the first device and a second mark on the second device are imaged, and information is output based on the imaging the first mark and the second mark.

19 Claims, 25 Drawing Sheets

(56) References Cited

FOREIGN PATENT DOCUMENTS

| | | | |
|---|---|---|---|
| JP | 2003-321850 | A | 11/2003 |
| JP | 2004-130276 | A | 4/2004 |
| JP | 2005-273295 | A | 10/2005 |
| JP | 2007-090323 | A | 4/2007 |
| JP | 2008-114986 | A | 5/2008 |
| JP | 2008-229523 | A | 10/2008 |
| JP | 2010-022945 | A | 2/2010 |
| JP | 2010-261183 | A | 11/2010 |
| JP | 2014-074321 | A | 4/2014 |
| WO | 2016/137016 | A1 | 9/2016 |

* cited by examiner

FIG. 2
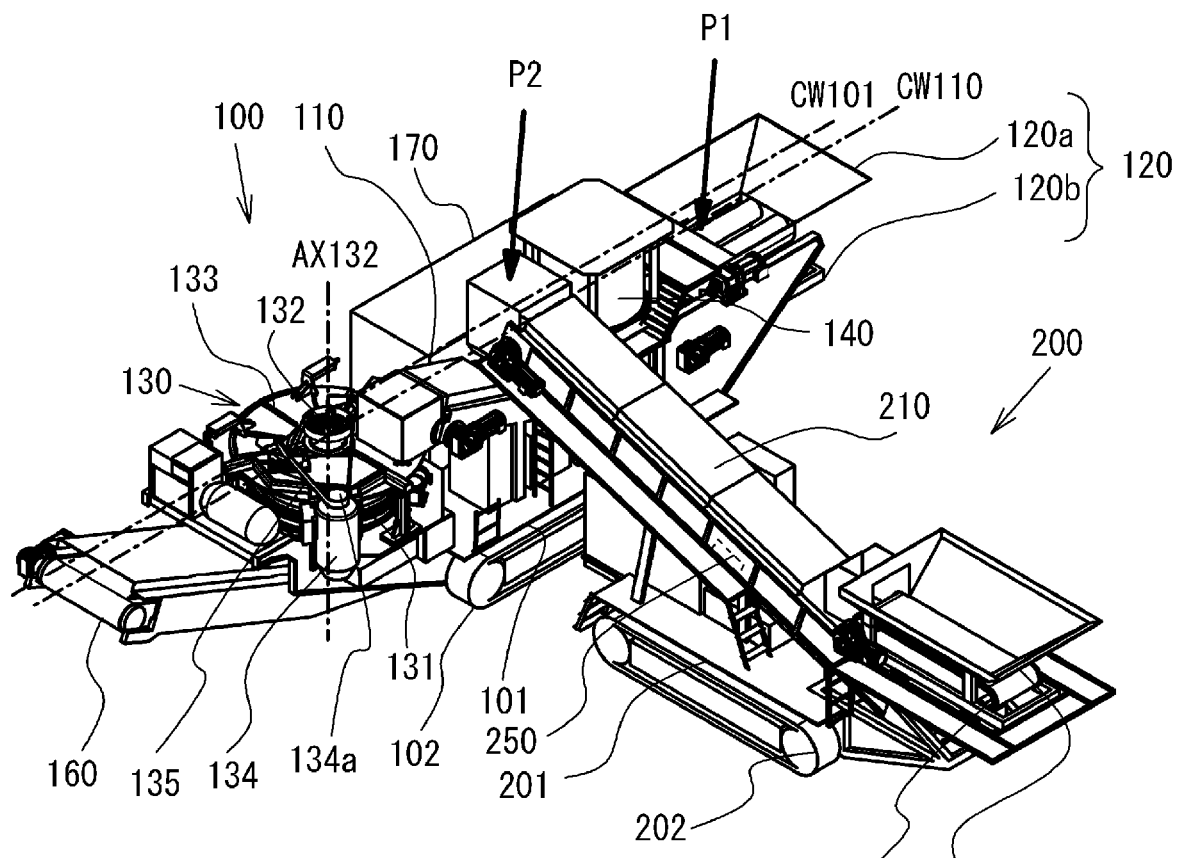
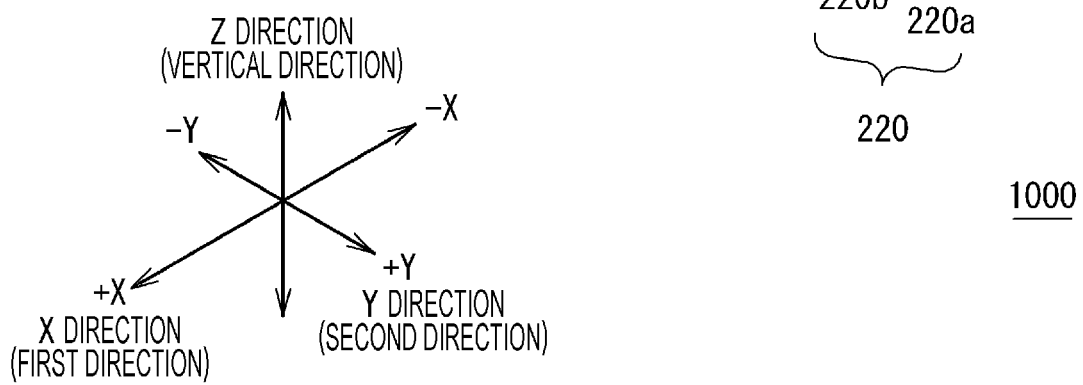

FIG. 11
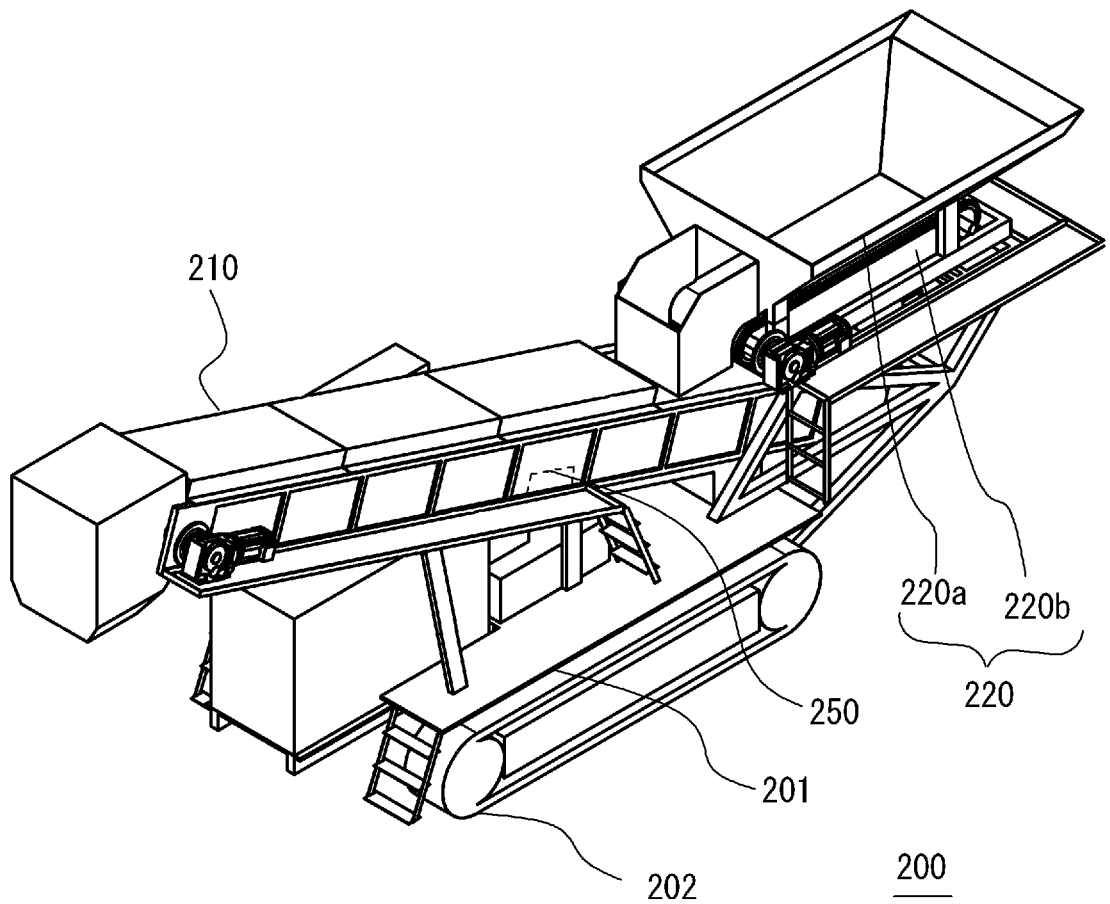
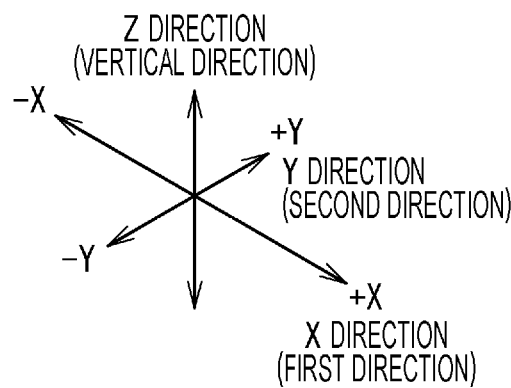

MIXING DEVICE

TECHNICAL FIELD

The present invention relates to a mixing device.

BACKGROUND

Conventionally, to improve and effectively utilize construction-generated soil and the like, a base material that is a target of improvement is mixed with another base material having properties different from that of the base material or an additive. For example, JP Patent Publication No. 2014-074321 A discloses a soil reclaimer including a hopper divided into two by installing an openable/closable gate in a hopper for two types of mixing. According to JP Patent Publication No. 2014-074321 A, it is possible to supply the soil generated at the site (first base material) and the recycled crushed stone (second base material) at any ratio by adjusting the opening and closing dimensions of the openable/closable gate.

SUMMARY

However, the soil reclaimer of JP Patent Publication No. 2014-074321 A has room for improvement in terms of usability.

Therefore, an object of the present invention is to provide a user-friendly mixing device.

According to the present specification, there is disclosed a mixing device including a carrying conveyor that conveys a first base material supplied from a first base material supply unit and a second base material different from the first base material and supplied from a second base material supply unit in a first direction, and a mixing unit that mixes the first base material and the second base material with a rotating member. The rotating member is provided such that a direction in which a rotation axis of the rotating member extends does not intersect with a conveyance center line extending in the first direction of the carrying conveyor.

Also according to the present specification, a positioning method for positioning a first device and a second device separated from the first device is described. The positioning method includes the steps of moving the second device so as to approach the first device, imaging a first mark on the first device and a second mark on the second device, and outputting information based on the imaging the first mark and the second mark.

According to the present invention, it is possible to provide a user-friendly mixing device.

BRIEF DESCRIPTION OF THE DRAWINGS

FIG. 2 is a perspective view of the mixing device according to the embodiment from a direction different from that in FIG. 1.

FIG. 11 is a perspective view of the second base material supply device included in the mixing device according to the embodiment from a direction different from that of FIG. 10.

FIG. 14A is a flowchart illustrating an example of first base material supply control, FIG. 14B is a flowchart illustrating an example of second base material supply control, and FIG. 14C is a flowchart illustrating an example of additive supply control.

DETAILED DESCRIPTION

Hereinafter, embodiments will be described with reference to the drawings.

Embodiment

Figure 1:
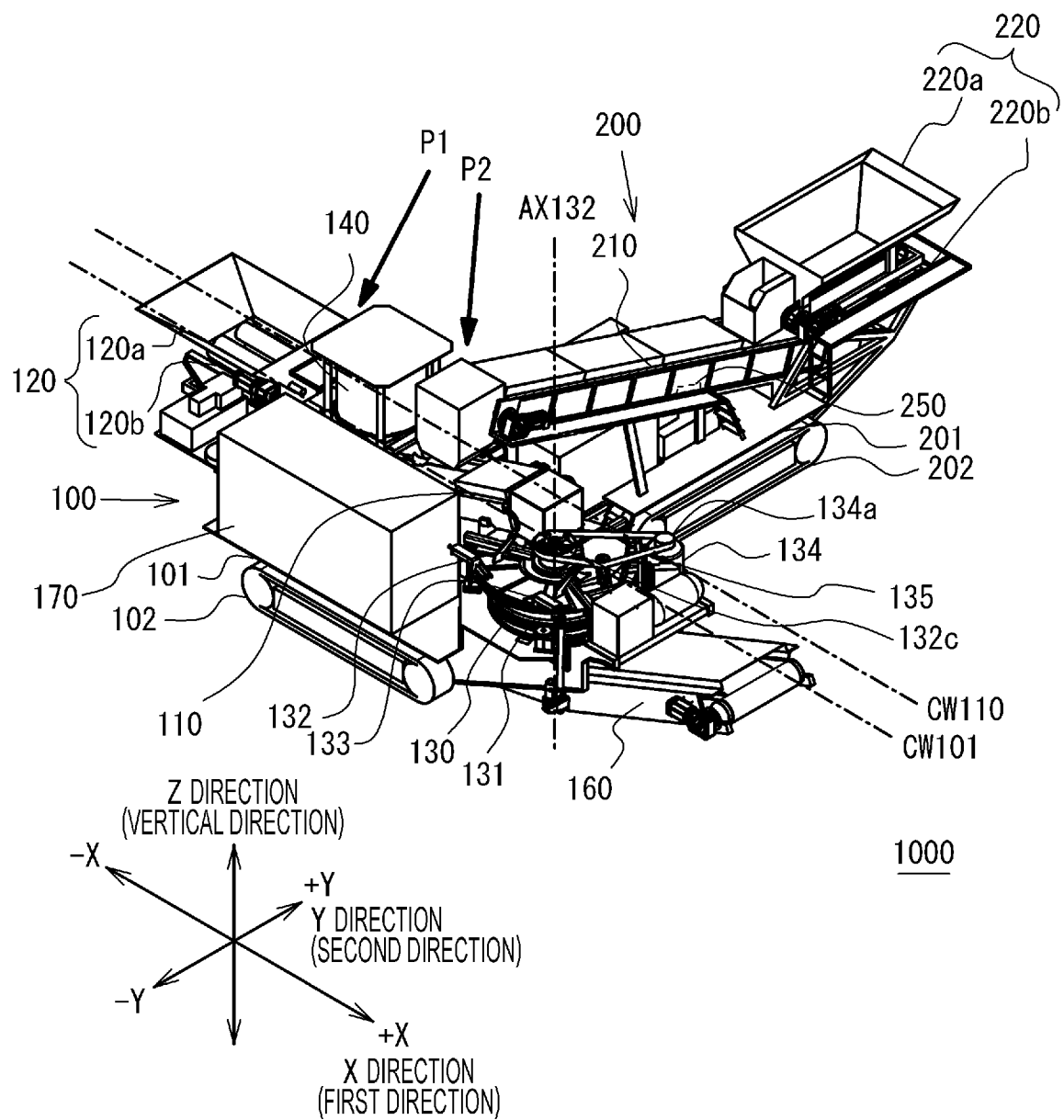
FIG. 1 is a perspective view of a mixing device according to an embodiment.

First, a schematic configuration of a mixing device 1000 according to an embodiment will be described with reference to FIGS. 1 and 2. FIGS. 1 and 2 are perspective views of the mixing device 1000, but the direction in which the mixing device 1000 is viewed is different between FIGS. 1 and 2. In the following description, for convenience, a vertical direction is defined as a Z direction, and biaxial directions orthogonal to each other in a horizontal plane are defined as an X direction and a Y direction. Here, the X direction coincides with a first direction that is a direction in which a first carrying conveyor 110 that will be described in detail later extends, and the Y direction coincides with a second direction orthogonal to the first direction in a horizontal plane. In the following description, −X and +X are used to describe the positional relationships of the components in the X direction, and −Y and +Y are similarly used to describe the positional relationships of the components in the Y direction.

The mixing device 1000 mixes the first base material and the second base material. In addition, an additive is added to the two materials as necessary. For example, the mixing device 1000 is installed at a site where embankment construction is performed, uses construction-generated soil excavated at the site as a first base material, and mixes a second base material and an additive to improve the first base material. The second base material is appropriately prepared in accordance with the properties of the first base material to obtain a desired improved soil. When the second base material having desired properties can be collected at the site, the second base material collected at the site may be used. The additive is appropriately selected and supplied from, for example, lime-based solidifying materials such as quicklime and slaked lime, cementitious solidifying materials such as ordinary cement and blast furnace cement, soil-improving materials made of polymer materials, natural fibers, and chemical fibers made of resin. When the additive is supplied and mixed with the first base material and the second base material, the properties, strength, and the like of the improved soil are adjusted.

The mixing device 1000 includes a first device 100 and a second base material supply device 200 used in combination with the first device 100. In the first device 100, a first base material supply unit 120, a first carrying conveyor 110, a mixing unit 130, and a discharge conveyor 160 are arranged in that order from the −X side to the +X side in the X direction. The first base material is charged into a first base material hopper 120a included in the first base material supply unit 120. Then, the first base material is supplied to the first carrying conveyor 110 at a first position P1 by a supply conveyor 120b provided below the first base material hopper 120a. The first carrying conveyor 110 is provided with a first weighing unit 150 (not illustrated in FIGS. 1 and 2, refer to FIGS. 4 to 6) that measures the weight of the first base material. This will be described later.

The second base material supply device 200 includes a second carrying conveyor 210 and a second base material supply unit 220. The second base material supply device 200 is connected to the first device 100 such that the direction in which the second carrying conveyor 210 extends coincides with the Y direction. The second carrying conveyor 210 is connected to the first carrying conveyor 110 at a second position P2 on the +X side of the first position P1 in the first device 100. That is, the second position P2 is a supply position of the second base material. The second carrying conveyor 210 is provided with a second weighing unit 250 that measures the weight of the second base material. This will be described later.

The first device 100 includes an additive supply unit 140 between the first position P1 and the second position P2. The additive is supplied from the additive supply unit 140 onto the first carrying conveyor 110. As a result, the first base material, the second base material, and the additive are supplied onto the first carrying conveyor 110. The first carrying conveyor 110 conveys the supplied first base material, second base material, and additive to the mixing unit 130.

Figure 3:
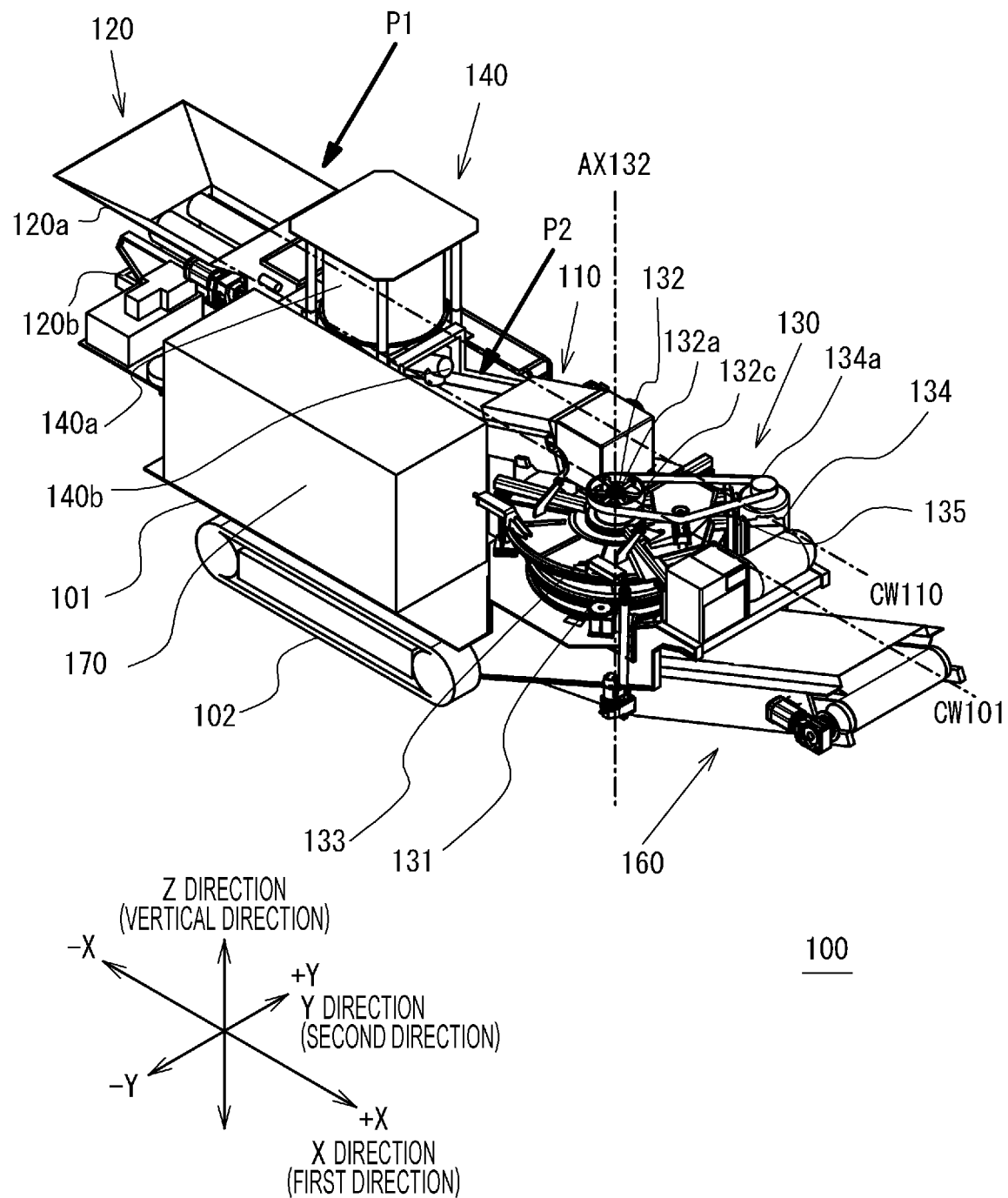
FIG. 3 is a perspective view of a first device included in the mixing device according to the embodiment.
Figure 4:
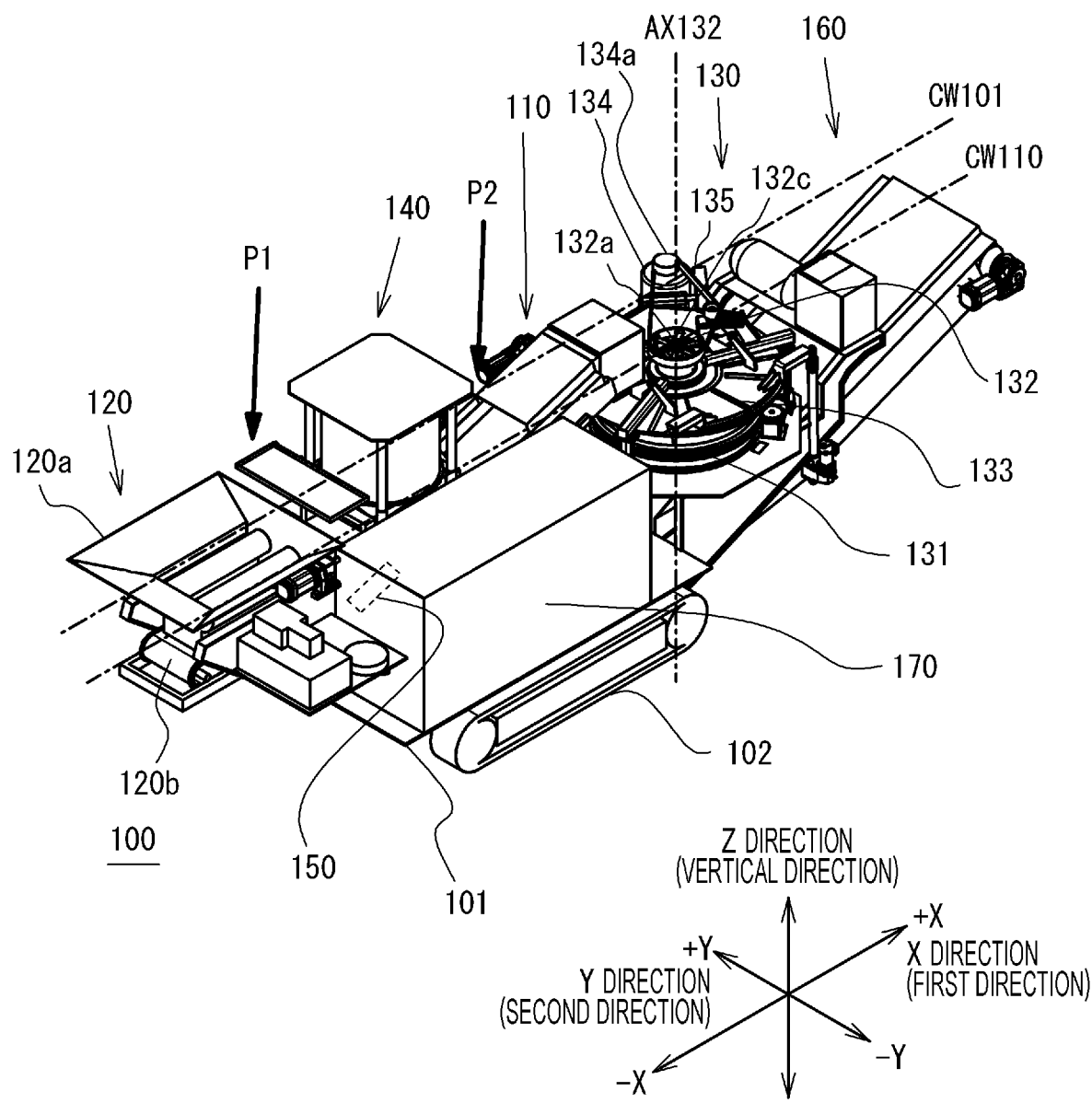
FIG. 4 is a perspective view of the first device included in the mixing device according to the embodiment from a direction different from that in FIG. 3.
Figure 5:
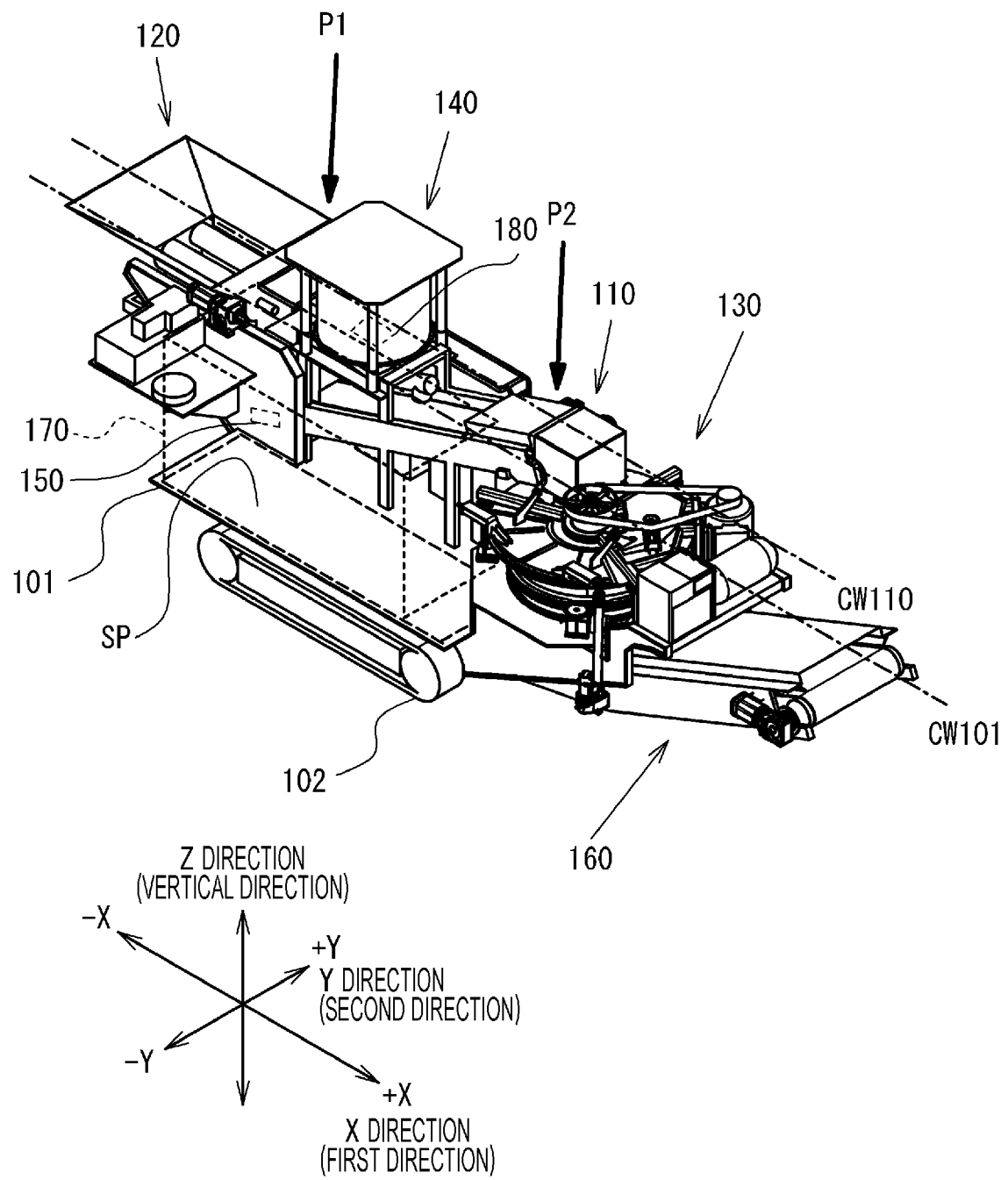
FIG. 5 is a perspective view illustrating a state where a generator is lowered from the first device included in the mixing device according to the embodiment.
Figure 6:
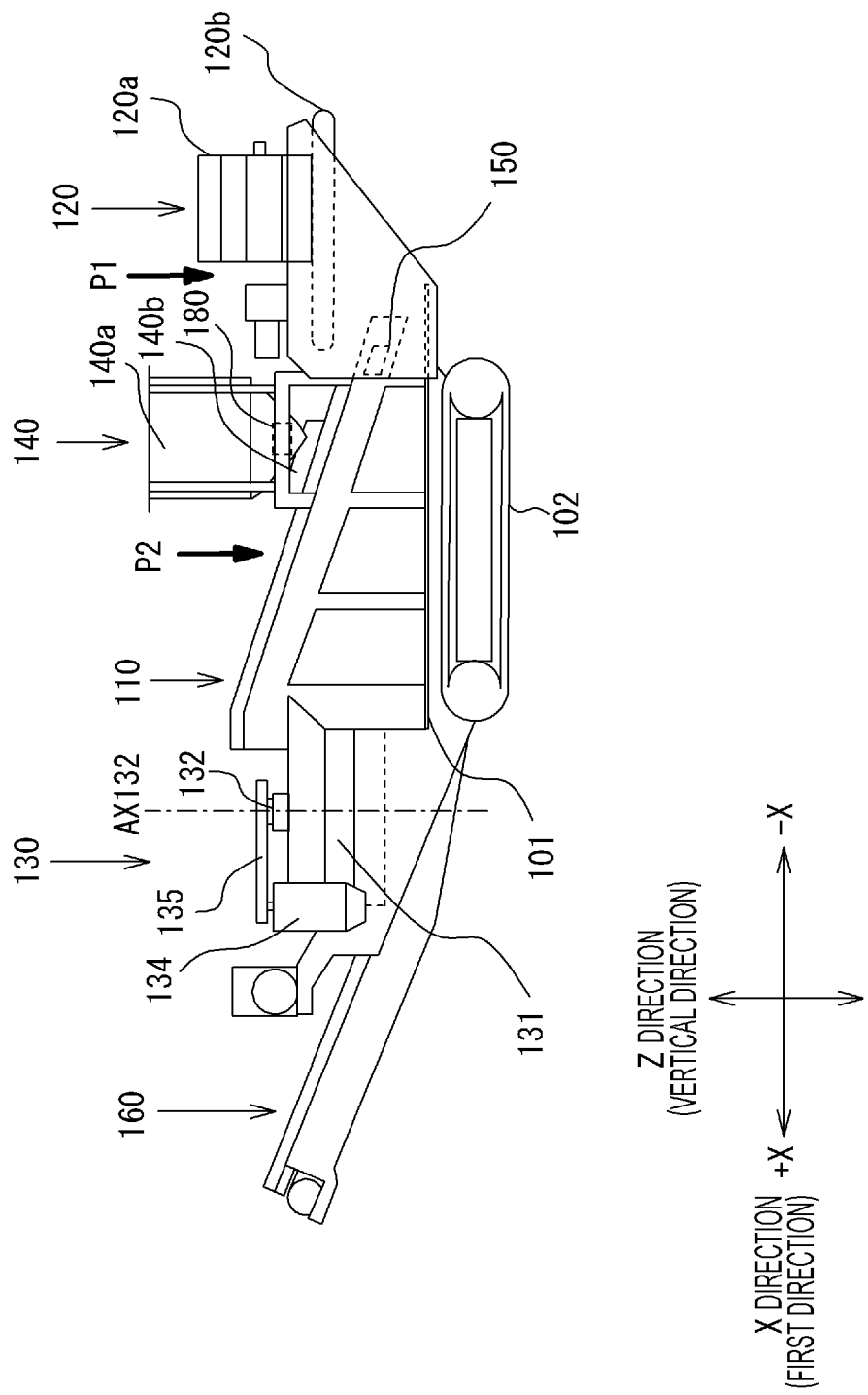
FIG. 6 is a side view of the first device included in the mixing device according to the embodiment.
Figure 7:
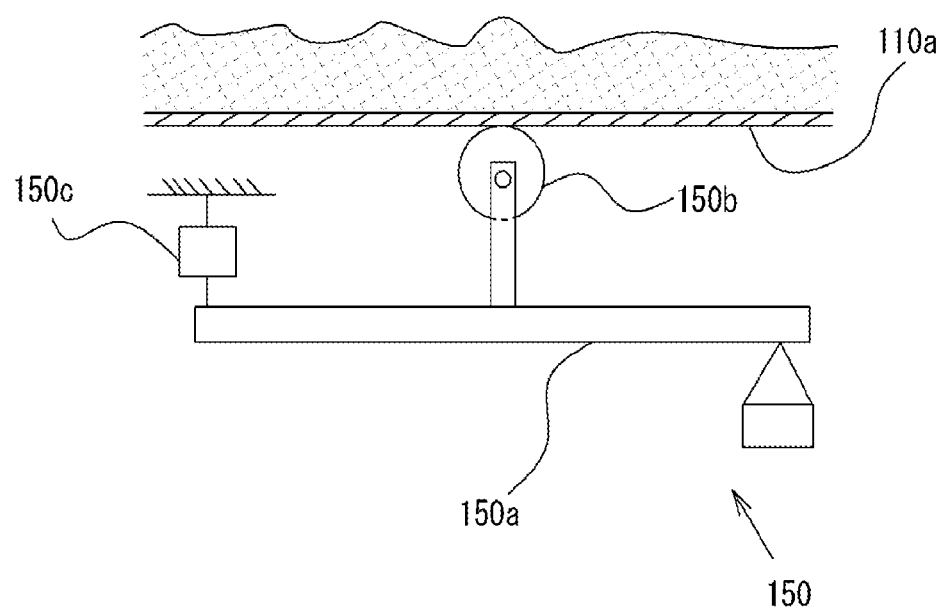
FIG. 7 is an explanatory view schematically illustrating a first weighing unit included in the first device included in the mixing device according to the embodiment.

Next, the first device 100 will be described in detail with reference to FIGS. 3 to 7. FIGS. 3 and 4 are perspective views of the first device 100, but the direction in which the first device 100 is viewed is different between FIGS. 3 and 4. FIG. 5 illustrates a state where a generator 170 is taken out of the first device 100. FIG. 6 is a side view of the first device 100. FIG. 7 is an explanatory view schematically illustrating the first weighing unit 150 included in the first device 100.

As described above, the first device 100 includes the first carrying conveyor 110, the first base material supply unit 120, the mixing unit 130, the additive supply unit 140, and the discharge conveyor 160. These are mounted on and supported by a first support member 101. The first support member 101 in the present embodiment is a plate-shaped member, but may be, for example, a frame-shaped member so long as it can support these elements. The generator 170 is mounted on the first support member 101 of the present embodiment. As described above, because the main equipment is supported by the first support member 101, the first device 100 is excellent in transportability and easily moves to the site and at the site. In the present embodiment, the first moving device 102 is attached to the first support member 101. As a result, the first device 100 can be caused to travel in a building site, a construction site, or the like in response to a remote controller operation or the like by an operator. The first moving device 102 in the present embodiment is an endless track, but the first moving device 102 may be a moving device using wheels or the like. By providing the first moving device 102, it is easy to perform the soil-improvement work while moving little by little at the site.

The first carrying conveyor 110 extends in the X direction, conveys the first base material, the second base material, and the additive from the −X side to the +X side, and charges the first base material, the second base material, and the additive into the mixing unit 130. The first carrying conveyor 110 includes the first weighing unit 150 between the first position P1 where the first base material is supplied and the additive supply unit 140. The first weighing unit 150 measures the weight of the first base material. The first weighing unit 150 can measure the weight of the first base material while the first base material is conveyed by being incorporated in the first carrying conveyor 110. The measurement value from the first weighing unit 150 is used for adjusting the mixing ratio of the first base material, the second base material, and the additive. Here, referring to FIG. 7, the first weighing unit 150 includes a support roller 150b that is supported by a support frame 150a and is provided below the conveying belt 110a of the first carrying conveyor 110. The support frame 150a is a lever that receives a load and is connected to a load cell 150c. The first weighing unit 150 can measure the weight of the first base material conveyed by the first carrying conveyor 110 based on the speed of the first carrying conveyor 110 and the measurement value of the load cell 150c. Since the mechanism itself of the first weighing unit 150 is conventionally known, a detailed description of a method of calculating a measurement value is omitted here.

The first base material is charged into the first base material supply unit 120. The first base material supply unit 120 includes the first base material hopper 120a. The first base material charged into the first base material hopper 120a is crushed by a rotating roller provided inside and falls onto a supply conveyor 102b provided on the lower side. The dropped first base material is supplied to the first carrying conveyor 110 at the first position P1.

The mixing unit 130 includes a drum 131 and a rotating member 132 rotatably provided in the drum 131. The rotating member 132 includes a shaft member 132a, a bearing member (not illustrated) that rotatably supports the shaft member 132a, an impact member 132b (not illustrated in FIGS. 3 to 5, refer to FIGS. 8 and 9), and a rotation axis side pulley 132c. The mixing unit 130 includes a lid portion 133 attached to the drum 131. The lid portion 133 is provided with a charging port 133a (not illustrated in FIGS. 3 to 5, refer to FIG. 8). The mixing unit 130 further includes a motor 134. The motor 134 includes a motor side pulley 134a. A driving belt 135 is attached between the rotation axis side pulley 132c and the motor side pulley 134a, and the rotating member 132 is rotated by driving of the motor 134. The rotation axis AX132 of the rotating member 132 (shaft member 132a) extends in the Z direction. The impact member 132b rotates in the drum 131 to crush the charged first base material and second base material, and the impact member 132b mixes the first base material and the second base material with the additive. The mixed first base material, second base material, and additive are discharged as improved soil from the lower portion of the drum 131 and fall onto the discharge conveyor 160 extending to the lower portion of the drum 131. The bearing member (not illustrated) is provided inside the rotating member 132 illustrated in FIG. 6. The bearing member is a cantilevered bearing member not provided below the rotating member 132.

The applicant of the present application has also proposed a rotary crushing device having a cantilever ball bearing in Japanese Patent Application No. 2020-004183 filed on Jan. 15, 2020. Also in the present embodiment, a ball bearing can be adopted as the bearing member (not illustrated), and an angular ball bearing can be adopted to improve the rotation accuracy and the rigidity of the shaft member 132a. In this manner, the shaft member 132a is supported in a cantilever manner on the upper side (first carrying conveyor 110 side) of the shaft member 132a, and the lower side (other end side) of the shaft member 132a is set as a free end, and thus there will be available space for disposing the bearing member on the lower side of the shaft member 132a. Therefore, in the present embodiment, the mixing unit 130 can be arranged on the lower side in the Z direction, and accordingly, the first base material supply unit 120 and the like can also be arranged on the lower side, and the overall height of the first device 100 as a whole can be lowered. Specifically, the total height of the first device 100 can be set to 3.8 m or less, the transportation height can be cleared to 3.8 m, which is a guide of the height at the time of transportation, and the degree of freedom of conveyance of the first device 100 by a truck or a trailer can be ensured.

As clearly illustrated in FIG. 6, the additive supply unit 140 is provided between the first position P1 and the second position P2. The additive supply unit 140 is provided to supply the additive onto the first carrying conveyor 110 on the +X side of the first weighing unit 150. The additive supply unit 140 includes an additive hopper 140a and a screw feeder 140b disposed below the additive hopper. The additive is cut out by the screw feeder 140b and supplied onto the first carrying conveyor 110. The additive supply unit 140 includes a third weighing unit 180 that measures the weight of the additive supplied onto the first carrying conveyor 110. As the third weighing unit 180, for example, a weighing device including a load cell can be applied.

The discharge conveyor 160 extends in the +X direction from the lower side of the mixing unit 130. The discharge conveyor 160 conveys the improved soil discharged from the drum 131 to a position away from the mixing unit 130 and discharges the improved soil. The improved soil can be used, for example, for the purpose of backfilling of a workpiece, backfilling of a building, backfilling of a civil engineering structure, embankment for river embankment, embankment for a road, embankment for land development, railway embankment, airport embankment, water surface reclamation, and the like.

The generator 170 is used as a power source for various driving units included in the first device 100 such as the first carrying conveyor 110. The generator 170 is also used as a power source for obtaining power of the first moving device 102. The generator 170 is mounted on the first support member 101 and moves together with the main equipment of the first device 100, and thus it is not necessary to attach and detach various cables and the like each time the first device 100 is moved, which is convenient.

Figure 8:
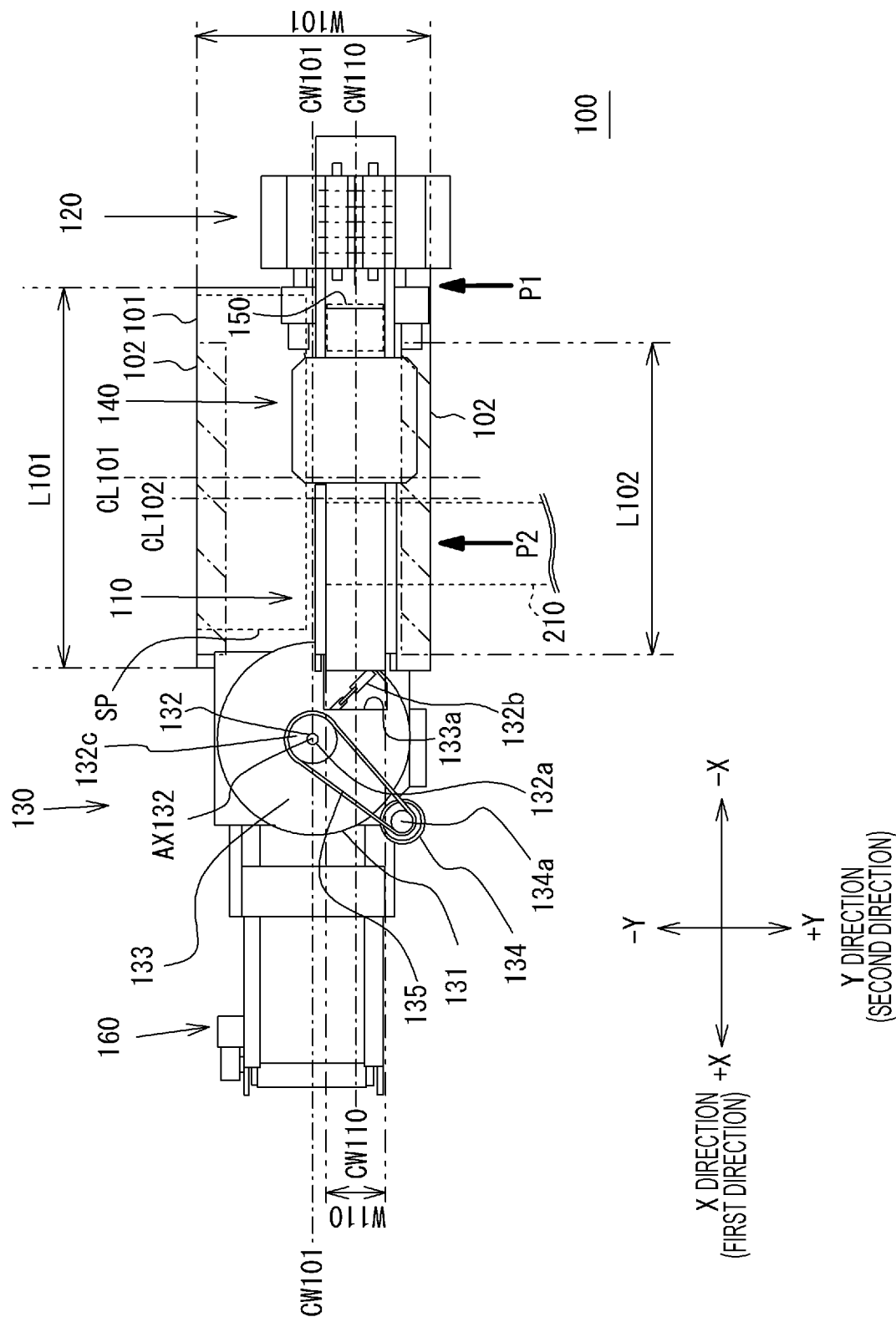
FIG. 8 is a plan view of the first device included in the mixing device according to the embodiment.
Figure 9:
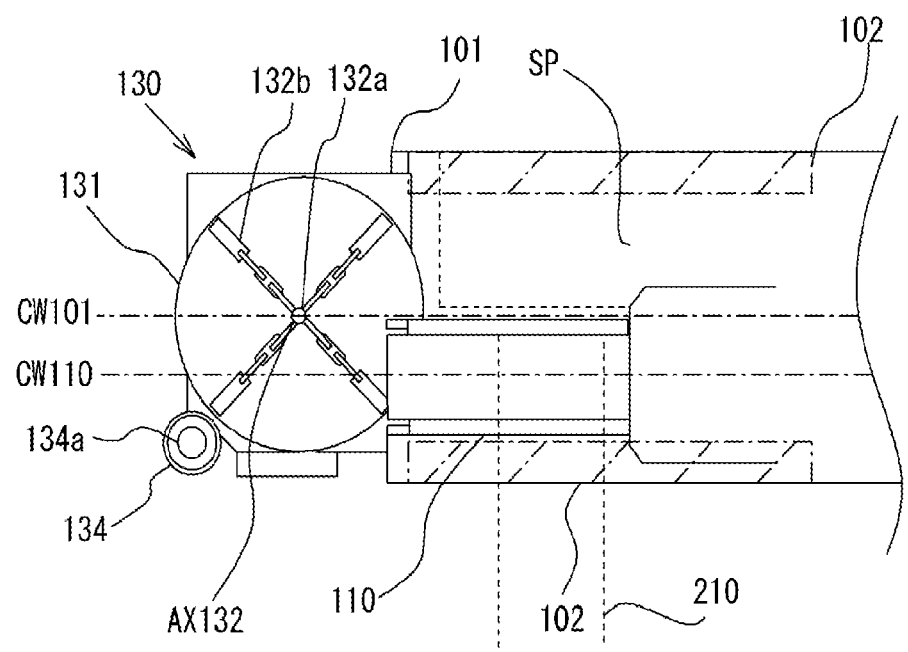
FIG. 9 is an enlarged explanatory view illustrating a connection position between a first carrying conveyor and a mixing unit which are included in the first device included in the mixing device according to the embodiment.

Here, the arrangement of each component included in the first device 100 will be described in detail with reference to FIGS. 8 and 9. FIG. 8 is a plan view of the first device 100, and FIG. 9 illustrates an enlarged connection position between the first carrying conveyor 110 and the mixing unit 130. In FIG. 9, the lid portion 133, the rotation axis side pulley 132c, and the driving belt 135 illustrated in FIG. 8 are omitted. An internal state of the drum 131 is illustrated in FIG. 9.

Referring to FIG. 8, a dimension in the X direction (first direction) of first support member 101 is a length L101, and a dimension in the Y direction (second direction) is a width W101. The center position of the first support member 101 in the X direction is a center line CL101, and the center position in the Y direction is a center line CW101. Here, the rotation axis AX132 of the rotating member 132 intersects with the center line CW101. That is, in FIG. 8, the rotation axis AX132 is positioned on the center line CW101.

Note that the width W101 is set to a width for mounting on a loading platform of a transport device that conveys the first device 100, such as a truck or a trailer, in consideration of the transportability of the first device 100.

Next, the dimension of the first carrying conveyor 110 in the Y direction (second direction) is a width W110, and the center line (conveyance center line) in the Y direction is CW110. In the present embodiment, the center line (conveyance center line) CW110 of the first carrying conveyor 110 in the Y direction is shifted in the +Y direction with respect to the center line CW101 of the first support member 101 in the Y direction. As a result, the rotation axis AX132 is disposed not to cross the conveyance center line CW110. As a result, a space is formed on the −Y side of the first carrying conveyor 110. In the present embodiment, the conveyance center line CW110 of the first carrying conveyor 110 is shifted in the +Y direction with respect to the center line CW101 of the first support member 101, and a space SP is formed due to this shift. Various types of equipment can be mounted in the space SP. In the present embodiment, as illustrated in FIG. 5, the generator 170 is mounted in the space SP. That is, the generator 170 is mounted and supported on the first support member 101 in parallel with the first carrying conveyor 110 in the Y direction. As a result, the generator 170 can be conveyed as a part of the first device 100.

Here, referring to FIG. 9, the rotation axis AX132 is disposed not to cross the conveyance center line CW110, and accordingly, the first base material, the second base material, the additive conveyed by the first carrying conveyor 110 are charged along the peripheral edge of the drum 131. By shifting the rotation axis AX132 and the conveyance center line CW110 in this manner, the first base material, the second base material, and the additive, which are mixing target objects, can be easily charged into the drum 131. When the rotation axis AX132 coincides with the conveyance center line CW110, the tip end portion of the first carrying conveyor 110 approaches the shaft member 132a to connect the first carrying conveyor 110 having a predetermined width to the drum 131. When the tip end portion of the first carrying conveyor 110 approaches the shaft member 132a, the mixing target object falling from the first carrying conveyor 110 collides with a position close to the base of the impact member 132b. When the falling mixing target object collides with a position close to the base of the impact member 132b, the impact force becomes weak as compared with the vicinity of the tip end of the impact member, crushing and mixing are not sufficiently performed, and it is considered that the impact member 132b is easily worn in some cases. On the other hand, when the rotation axis AX132 is shifted from the conveyance center line CW110 as in the present embodiment, the degree of freedom of connection between the first carrying conveyor 110 and the drum 131 increases, and both are easily connected. In addition, the collision position of the falling mixing target object with the impact member 132b is improved, and wear of the impact member 132b is suppressed.

Returning to FIG. 8 again, the rotation axis AX132 is set to be shifted in the +X direction from the center line CL101 of the first support member 101 in the X direction. That is, the mixing unit 130 is supported by the first support member 101 such that the rotation axis AX132 is different from the center position of the first support member 101 in the X direction.

As described above, the rotation axis AX132 is shifted in the +X direction from the center line CL101 of the first support member 101 in the X direction, and the mixing unit 130 is installed to be separated from the first base material supply unit 120. Accordingly, a space for supplying the second base material and the additive can be ensured therebetween. That is, the second position P2 can be set on the first carrying conveyor 110 disposed between the first base material supply unit 120 and the mixing unit 130 to supply the second base material, and the additive can be supplied. As a result, the first base material, the second base material, and the additive can be collectively supplied to the mixing unit 130.

Note that the first device 100 of the present embodiment includes the first moving device 102. The first moving device 102 includes a pair of endless tracks, and the width thereof substantially coincides with the width W101 of the first support member 101. Therefore, the first moving device 102 is easily loaded on transportation equipment such as a truck or a trailer. In addition, by mounting the first carrying conveyor 110 and the generator 170 in parallel in the Y direction, it is possible to stably operate the first moving device 102 and stably move the first device 100. The dimension of the first moving device 102 in the X direction is L102, and the center line thereof is CL102. The rotation axis AX132 is also set to be shifted in the +X direction with respect to the center line CL102 and is positioned on the +X side with respect to the end portion on the +X side of the first moving device 102, but the shift amount is set within a range that does not affect the stable operation of the first moving device 102 in consideration of the center-of-gravity position of the first device 100.

Figure 10:
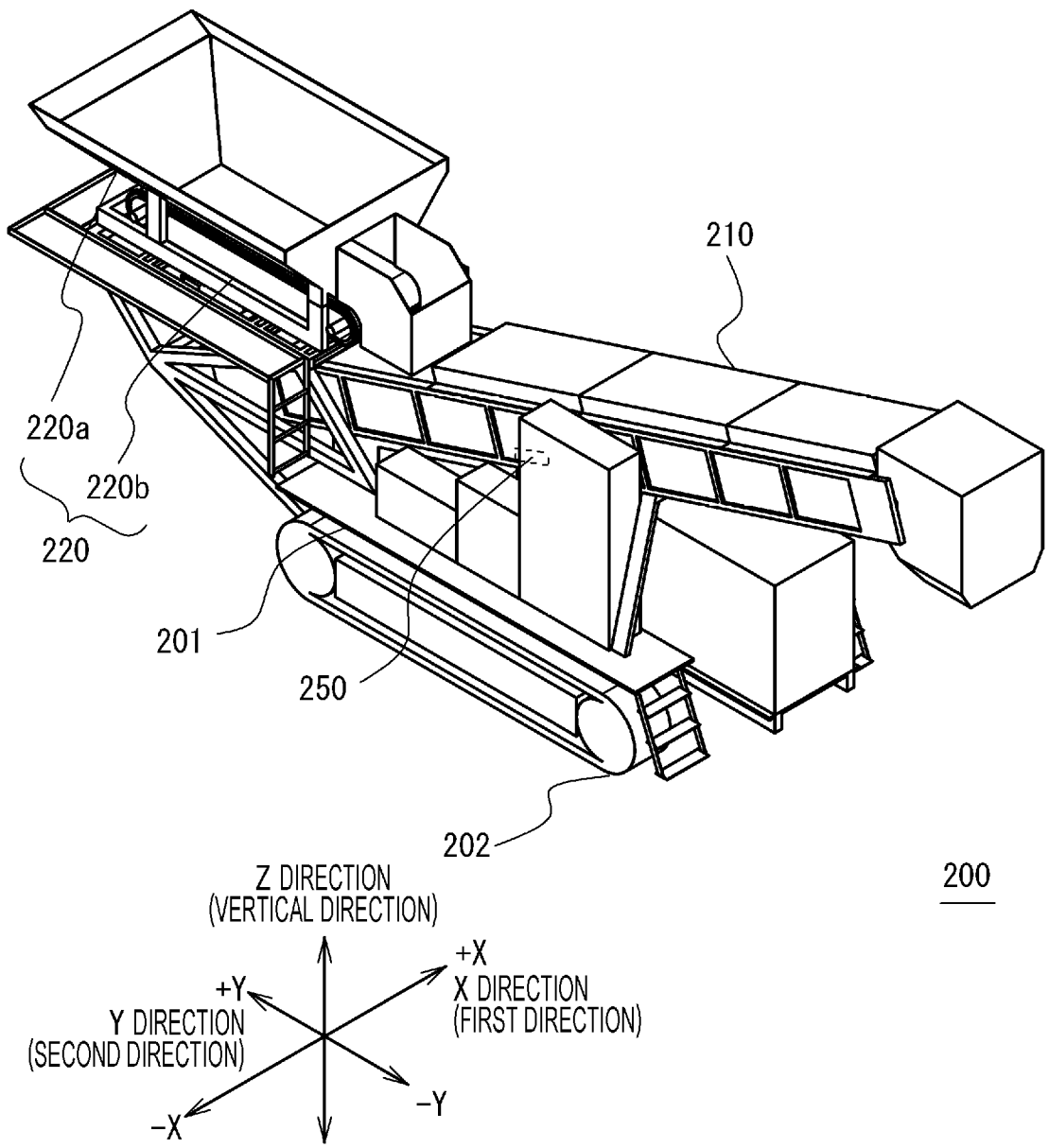
FIG. 10 is a perspective view of a second base material supply device included in the mixing device according to the embodiment.

Next, the second base material supply device 200 will be described with reference to FIGS. 10 and 11. FIGS. 10 and 11 are each perspective views of the second base material supply device 200, but the directions in which the second base material supply device 200 is viewed are different between FIGS. 10 and 11.

The second base material supply device 200 includes a second support member 201. The second support member 201 includes the second carrying conveyor 210 and the second base material supply unit 220. The second base material supply unit 220 includes a second base material hopper 220a and a supply conveyor 220b provided below the second base material hopper. One end portion of the second carrying conveyor 210 is positioned on the lower side of the supply conveyor 220b and extends obliquely upward therefrom. As illustrated in FIGS. 1 and 2, the other end of the second carrying conveyor 210 is connected to the first device 100 at the second position P2. The second base material supply device 200 includes a second moving device 202 below the second support member 201. The second moving device 202 has an endless track similarly to the first moving device 102, but the second moving device 202 may be a wheel or the like. The second base material supply device 200 is conveyed in a state of being separated from the first device 100, but the second base material supply device 200 can be easily moved by including the second moving device 202. Accordingly, the second base material supply device 200 is easily mounted on a truck or a trailer.

The second carrying conveyor 210 is provided with the second weighing unit 250 that measures the weight of the second base material. Because the configuration of the second weighing unit 250 is the same as that of the first weighing unit, the description thereof is omitted here.

Figure 12:
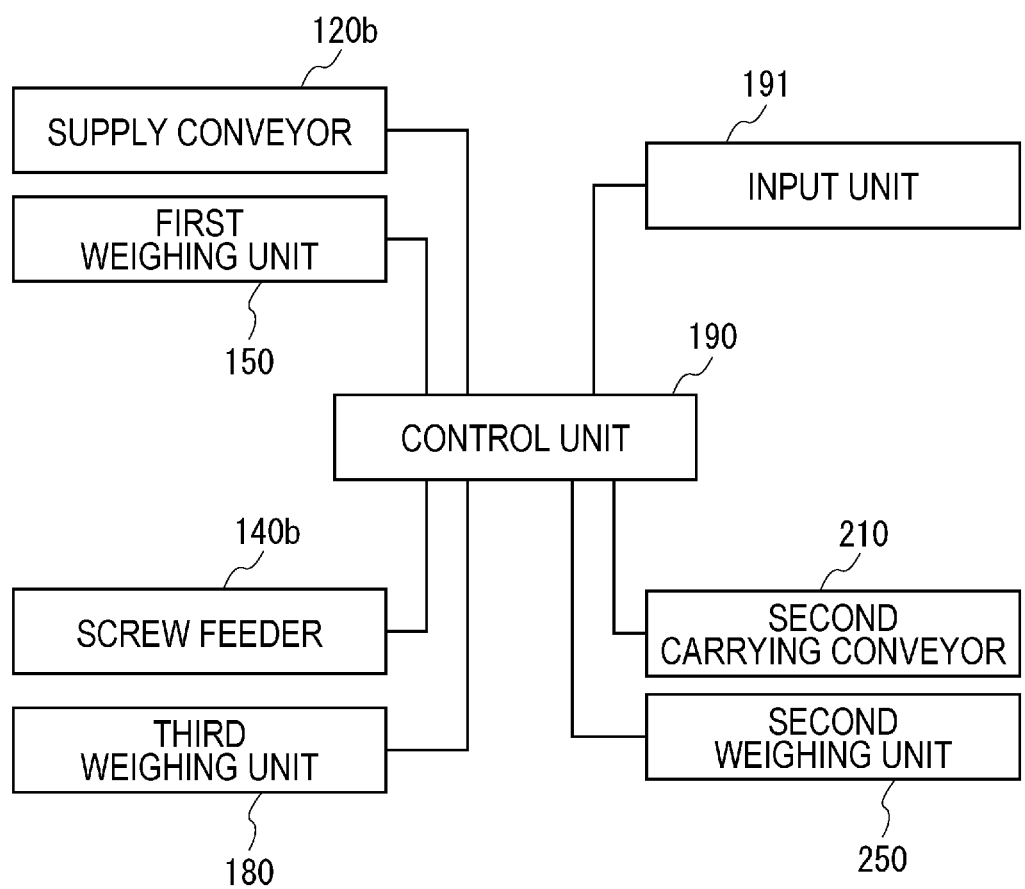
FIG. 12 is a block diagram illustrating a control system of the mixing device according to the embodiment.

Next, a control system of the mixing device 1000 according to the embodiment will be described with reference to FIG. 12. FIG. 12 is a block diagram illustrating a control system of the mixing device 1000 according to the embodiment. The mixing device 1000 includes a control unit 190 and an input unit 191 connected to the control unit 190. The control unit 190 and the input unit 191 are provided in the first device 100. The control unit 190 includes a central processing unit (CPU), a read-only memory (ROM), a random-access memory (RAM), and a storage unit (here, a hard disk drive (HDD)). Information on the mixing ratio of the first base material, the second base material, and the additive is input from the input unit. The supply conveyor 120b, the first weighing unit 150, the screw feeder 140b, the third weighing unit 180, the second carrying conveyor 210, and the second weighing unit 250 are connected to the control unit 190 to be capable of communicating therewith. Note that the connection in which the control unit 190 and other elements can communicate with each other may be a wired connection or a wireless connection.

Figure 13:
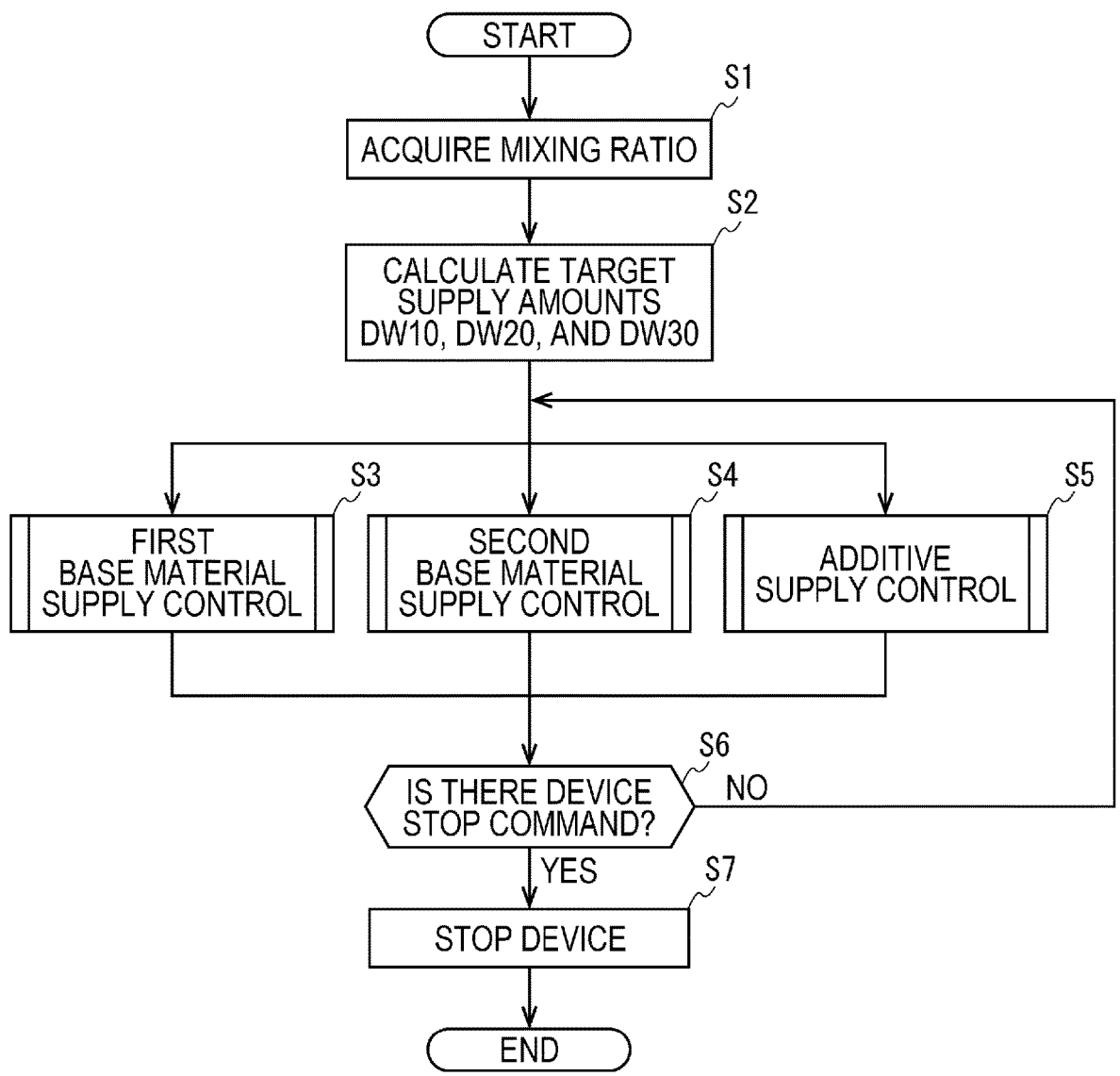
FIG. 13 is a flowchart illustrating an example of control of the mixing device according to the embodiment.
Figure 14C:
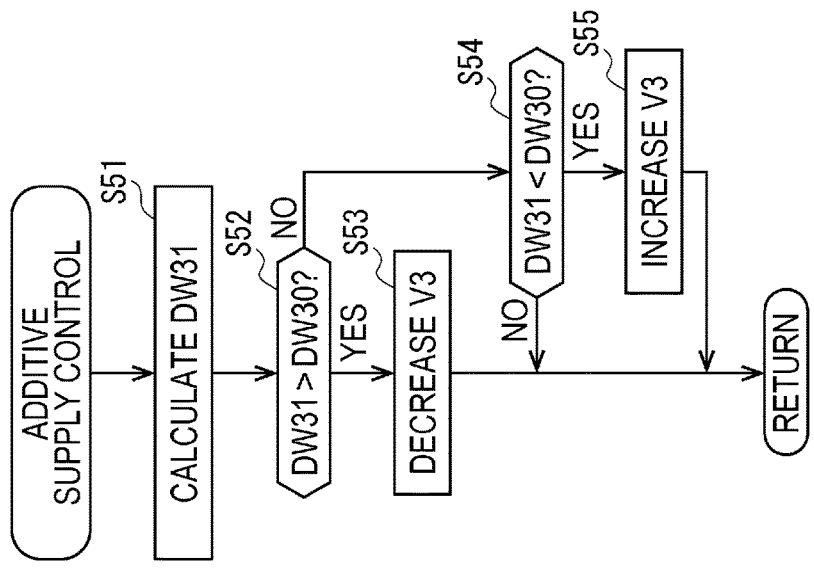
FIGS. 14A to 14C are flowcharts illustrating a subroutine included in control of the mixing device according to the embodiment, where
Figure 14B:
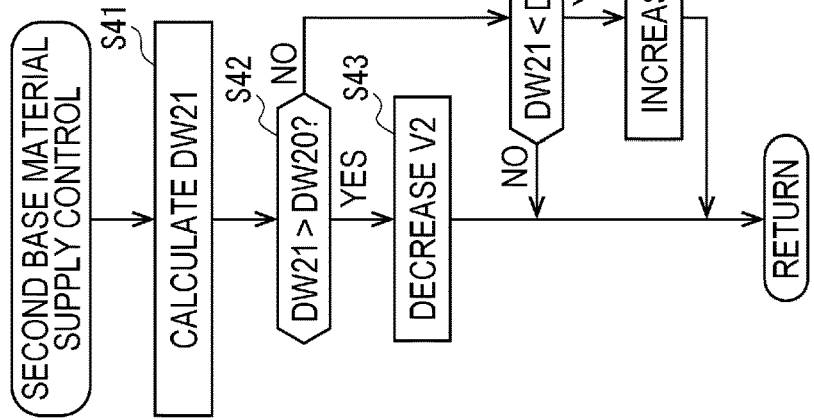
Figure 14A:
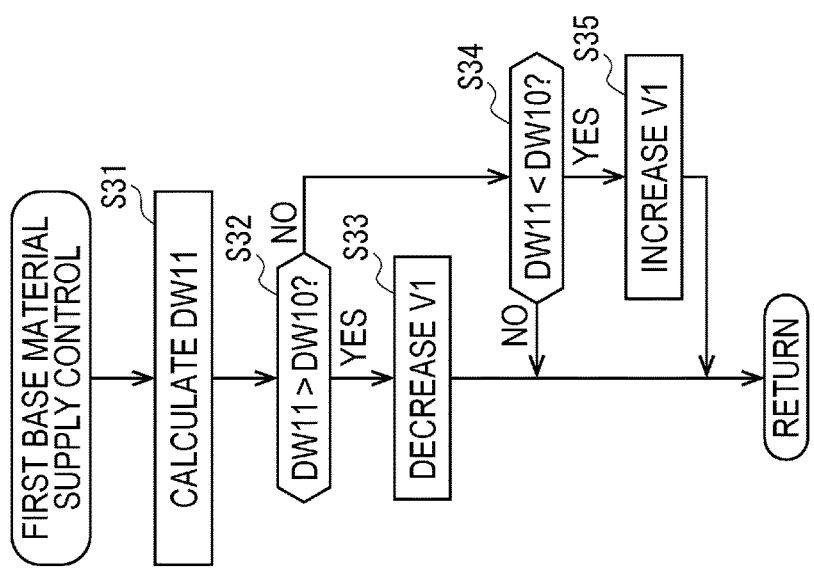

Next, an example of control in the mixing device 1000 will be described with reference to FIGS. 13 to 14C. FIG. 13 is a flowchart illustrating an example of main control of the mixing device 1000. FIG. 14A is a flowchart illustrating an example of first base material supply control, FIG. 14B is a flowchart illustrating an example of second base material supply control, and FIG. 14C is a flowchart illustrating an example of additive supply control.

Referring to FIG. 13, the control unit 190 acquires the mixing ratio of the first base material, the second base material, and the additive by the input from the input unit

191. Then, in step S2, the control unit 190 calculates a target supply amount DW10 for the first base material, a target supply amount DW20 for the second base material, and a target supply amount DW30 for the additive.

The control unit 190 performs the first base material supply control in step S3, the second base material supply control in step S4, and the additive supply control in step S5. These controls are subroutines illustrated in FIGS. 14A to 14C that are executed in parallel.

Referring to FIG. 14A, in step S31, the control unit 190 calculates a supply amount DW11 of the first base material at that time. The supply amount DW11 is calculated based on a conveyance speed V1 of the supply conveyor 120b at that time and the weighing result by the first weighing unit 150. In step S32, the control unit 190 determines whether or not the calculated supply amount DW11 is heavier than the target supply amount DW10 calculated in step S2. When an affirmative determination (YES determination) is made in step S32, the control unit 190 proceeds to step S33. In step S33, the control unit 190 decreases the conveyance speed V1 by a predetermined decrease width. After executing step S33, the processing returns, and the control unit 190 repeats the processing from step S31. On the other hand, when a negative determination (NO determination) is made in step S32, the control unit 190 proceeds to step S34. In step S34, the control unit 190 determines whether or not the supply amount DW11 at that time of calculation in step S31 is smaller than the target supply amount DW10 calculated in step S2. When an affirmative determination is made in step S34, the control unit 190 proceeds to step S35. In step S35, the control unit 190 increases the conveyance speed V1 by a predetermined increase width. After executing step S35, the processing returns, and the control unit 190 repeats the processing from step S31. On the other hand, when a negative determination is made in step S34, the control unit 190 repeats the processing from step S31 while maintaining the conveyance speed V1 at that time. The control unit 190 repeatedly performs the first base material supply control in real time, for example.

Referring to FIG. 14B, in step S41, the control unit 190 calculates a supply amount DW21 of the second base material at that time. The supply amount DW21 is calculated based on a conveyance speed V2 of the second carrying conveyor 210 at that time and the weighing result by the second weighing unit 250. In step S42, the control unit 190 determines whether or not the calculated supply amount DW21 is heavier than the target supply amount DW20 calculated in step S2. When an affirmative determination (YES determination) is made in step S42, the control unit 190 proceeds to step S43. In step S43, the control unit 190 decreases the conveyance speed V2 by a predetermined decrease width. After executing step S43, the processing returns, and the control unit 190 repeats the processing from step S41. On the other hand, when a negative determination (NO determination) is made in step S42, the control unit 190 proceeds to step S44. In step S44, the control unit 190 determines whether or not the supply amount DW21 at that time of calculation in step S41 is smaller than the target supply amount DW20 calculated in step S2. When an affirmative determination is made in step S44, the control unit 190 proceeds to step S45. In step S45, the control unit 190 increases the conveyance speed V2 by a predetermined increase width. After executing step S45, the processing returns, and the control unit 190 repeats the processing from step S41. On the other hand, when a negative determination is made in step S44, the control unit 190 repeats the processing from step S41 while maintaining the conveyance speed V2 at that time. The control unit 190 repeatedly performs the second base material supply control in real time, for example.

Referring to FIG. 14C, in step S51, the control unit 190 calculates a supply amount DW31 of the additive at that time. The supply amount DW31 is calculated based on a conveyance speed V3 of the screw feeder 140b at that time and the weighing result by the third weighing unit 180. In step S52, the control unit 190 determines whether or not the calculated supply amount DW31 is heavier than the target supply amount DW30 calculated in step S2. When an affirmative determination (YES determination) is made in step S52, the control unit 190 proceeds to step S53. In step S53, the control unit 190 decreases the conveyance speed V3 by a predetermined decrease width. After executing step S53, the processing returns, and the control unit 190 repeats the processing from step S51. On the other hand, when a negative determination (NO determination) is made in step S52, the control unit 190 proceeds to step S54. In step S54, the control unit 190 determines whether or not the supply amount DW31 at that time of calculation in step S51 is smaller than the target supply amount DW30 calculated in step S2. When an affirmative determination is made in step S54, the control unit 190 proceeds to step S55. In step S55, the control unit 190 increases the conveyance speed V3 by a predetermined increase width. After executing step S55, the processing returns, and the control unit 190 repeats the processing from step S51. On the other hand, when a negative determination is made in step S54, the control unit 190 repeats the processing from step S51 while maintaining the conveyance speed V3 at that time. The control unit 190 repeatedly performs the additive supply control in real time, for example.

After starting the control from step S3 to step S5, the control unit 190 executes step S6. In step S6, the control unit 190 determines whether there is a stop command to the mixing device 1000. When an affirmative determination is made in step S6, the control unit 190 stops the mixing device 1000 in step S7, and the process ends. On the other hand, when a negative determination is made in step S6, the control unit 190 repeats the control from step S3 to step S5.

Here, the effect of mixing the first base material, the second base material, and the additive with a mixing ratio based on the weight as in the present embodiment will be described. When the mixing ratio is determined based on the volumes of the first base material, the second base material, and the additive, it is assumed that the volumes of these materials change depending on the state, and it becomes difficult to mix these materials at an accurate ratio. For example, the actual amount of the first base material is different between the first base material in a state where there are many gaps and cavities and the first base material in a state where the first base material is compressed and has a high density even when the apparent volume is substantially the same. Therefore, when the mixing ratio is managed based on the weight, the accuracy of the mixing ratio increases, and it becomes easy to obtain improved soil having desired properties.

In the mixing device 1000 of the present embodiment, since the rotating member 132 is provided such that the rotation axis AX132 of the rotating member 132 included in the mixing unit 130 does not cross the conveyance center line CW110 of the first carrying conveyor 110, the space SP can be ensured on the side of the first carrying conveyor 110. Various types of equipment can be mounted in this space SP. When various types of equipment are mounted in the space SP, the transportability of the mixing device 1000 as a whole is improved. In addition, the first base material, the second base material, and the additive conveyed by the first carrying conveyor 110 are charged along the peripheral edge of the drum 131, and accordingly the collision position of the falling mixing target object with the impact member 132b is improved. As a result, wear of the impact member 132b is suppressed. Because wear of the impact member 132b is suppressed, frequency of maintenance can be suppressed. As described above, according to the mixing device 1000 of the present embodiment, the usability can be improved.

The conveyance speed of the supply conveyor 120b, the second carrying conveyor 210, and the screw feeder 140b may be changed according to the detected load current by detecting the load current of the motor 134. Specifically, when the load current of the motor 134 exceeds 90% of the rated current value of the motor 134, it is assumed that the load of the mixing unit 130 is large, and the control unit 190 may perform control to reduce the conveyance speed of the supply conveyor 120b, the second carrying conveyor 210, and the screw feeder 140b. When the load current of the motor 134 is less than 70% of the rated current value of the motor 134, the control unit 190 may perform control to increase the conveyance speed of the supply conveyor 120b, the second carrying conveyor 210, and the screw feeder 140b assuming that there is a margin for crushing and mixing the mixing unit 130.

In addition, the properties of the second base material and the additive are known, whereas the properties of the first base material are often unknown because of construction-generated soil. Therefore, the control unit 190 may control the conveyance speed between the second carrying conveyor 210 and the screw feeder 140b according to the control status of the supply conveyor 120b.

The mixing device 1000 of the present embodiment includes the first base material supply unit 120 and the second base material supply unit 220. The first base material supply unit 120 includes the first base material hopper 120a dedicated to the first base material, and the second base material supply unit 220 includes the second base material hopper 220a dedicated to the second base material. Therefore, a large amount of the first base material and the second base material can be charged into each hopper, and improved soil can be efficiently obtained.

In the mixing device 1000 of the present embodiment, the first carrying conveyor 110 is supported by the first support member 101 such that the conveyance center line CW110 of the first carrying conveyor 110 is shifted from the center line CW101 of the first support member 101. The generator 170 is mounted in the space SP generated by this. As a result, the generator 170 can be conveyed as a part of the first device 100. In addition, because the generator 170 is supported by the first support member 101 in parallel with the first carrying conveyor 110 in the Y direction, the center of gravity of the first device 100 is stabilized, and the stability during the movement and operation of the first device 100 is increased.

According to the mixing device 1000 of the present embodiment, the mixing unit 130 is supported by the first support member 101 such that the rotation axis AX132 of the rotating member 132 is different from the center position (center line CL101) of the first support member 101 in the X direction (first direction). As a result, it is possible to ensure a position where the second base material is supplied onto the first carrying conveyor 110 and a position where the additive is supplied. In addition, the first weighing unit 150 can be provided on the first carrying conveyor 110.

The mixing device 1000 of the present embodiment includes the additive supply unit 140. Therefore, it is easy to supply the additive at the site. The additive supply unit 140 is positioned between a position (first position P1) where the first base material is supplied from the first base material supply unit 120 and a position (second position P2) where the second base material is supplied from the second base material supply unit 220. Therefore, the additive supply unit 140 can be moved together with the first carrying conveyor 110, the first base material supply unit 120, and the like, and high transportability of the first device 100 can be obtained.

Because the mixing device 1000 of the present embodiment includes the first weighing unit 150, the second weighing unit 250, and the third weighing unit 180, the mixing ratio of the first base material, the second base material, and the additive can be accurately managed based on the weights thereof.

The first device 100 included in the mixing device 1000 of the present embodiment includes the first moving device 102 that moves while holding the first carrying conveyor 110, the first base material supply unit 120, and the mixing unit 130. Therefore, the first device 100 can be easily moved, and can be easily loaded and unloaded to and from transportation equipment such as a truck and a trailer.

The above-described embodiments are preferred examples of the present invention. However, the present invention is not limited thereto, and various modifications can be made without departing from the gist of the present invention. For example, a crane that supplies the first base material to the first base material hopper 120a may be provided. In this case, it is preferable to provide a crane via a post member such that the crane is positioned above the first base material hopper 120a. The post member and the crane may be provided using the space SP or may be provided in the vicinity of the first base material supply unit 120.

Modification Example 1

Figure 15A:
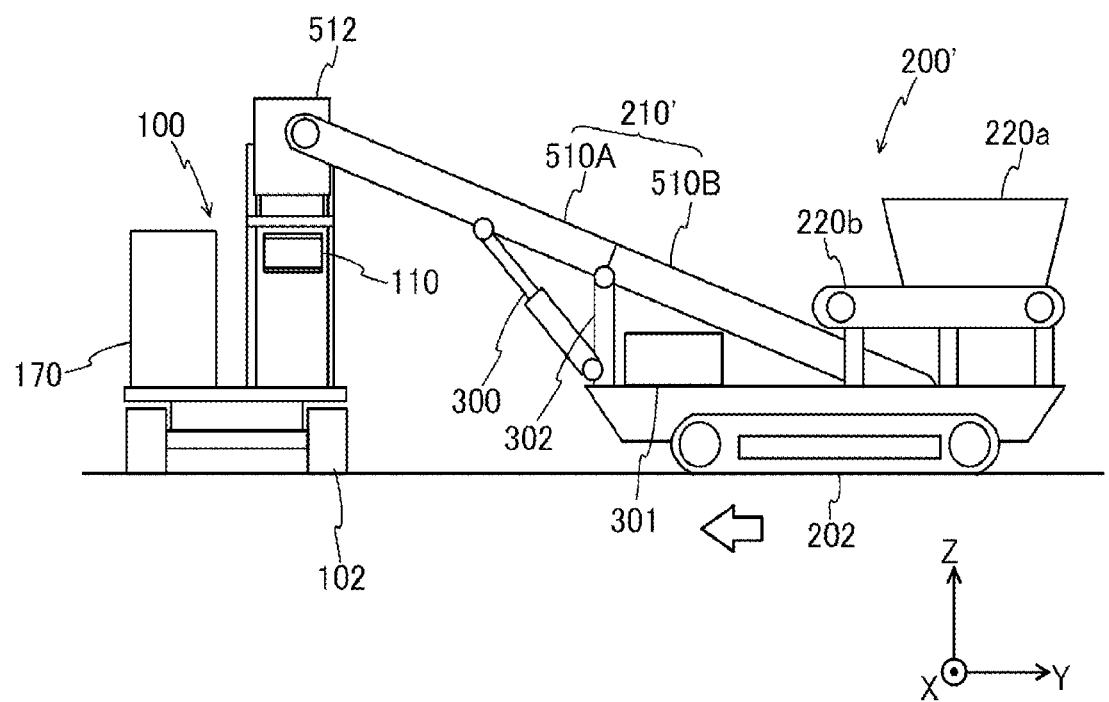
FIGS. 15A and 15B are views for explaining Modification Example 1.

Hereinafter, Modification Example 1 will be described with reference to FIGS. 15A to 16B. A second base material supply device 200' according to Modification Example 1 can approach the first device 100 from one side (+Y side) as illustrated in FIG. 15A and can approach the first device 100 from the other side (−Y side) as illustrated in FIG. 15B.

Figure 15B:
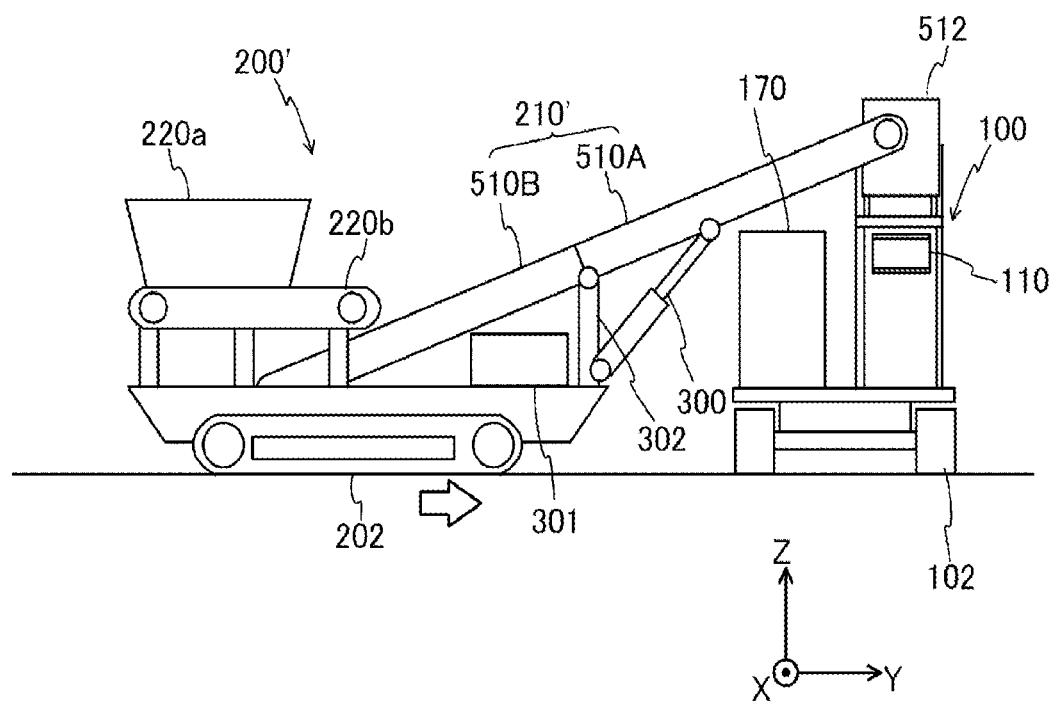

More specifically, as illustrated in FIG. 15B, even when the second base material supply device 200' approaches the first device 100 from the −Y side via the second moving device 202, a second carrying conveyor 210' (belt conveyor) of the second base material supply device 200' is designed not to be in contact with any part (for example, the generator 170) of the first device 100, that is, to be in non-contact therewith. That is, the length of the second carrying conveyor 210' is set to be longer than the length of the second carrying conveyor 210 (refer to FIG. 10 and the like) of the above embodiment, whereby the height of a chute portion 512 provided at the tip end of the second carrying conveyor 210' is set to be high. Because the inclination angle of the second carrying conveyor 210' is determined such that the second base material to be conveyed does not slide downward, the inclination angle is substantially the same as the inclination angle of the second carrying conveyor 210 of the above embodiment. Therefore, in the present first modification example, the height of the chute portion 512 is increased by increasing the length of the second carrying conveyor 210'. The second carrying conveyor 210' conveys the second base material from the lower end side (second height) to the upper side (first height) of the first carrying conveyor 110, and the chute portion 512 is a member that guides the second base material such that the second base material conveyed to the first height by the second conveyor 210' is properly supplied onto the first carrying conveyor 110.

As described above, according to the present Modification Example 1, the second base material supply unit 220 and the second carrying conveyor 210' cooperate to supply the second base material to the first carrying conveyor 110. Even when the second base material supply device 200' is installed from either the +Y side or the −Y side of the first device 100, the second base material can be supplied from the second base material supply device 200' to the first carrying conveyor 110. Therefore, the layout of the first device 100 and the second base material supply device 200' can be appropriately adjusted according to the topography, situation, and the like of the site.

Here, in the present Modification Example 1, because the height of the end portion (chute portion 512) of the second carrying conveyor 210' becomes high, when the second base material supply device 200' is placed on a truck 900 to convey the second base material supply device 200' to the site (refer to FIG. 16A), there is a possibility that the end portion of the second carrying conveyor 210' exceeds a height limit T. Therefore, in the present Modification Example 1, the second carrying conveyor 210' is configured to include the front-side conveyor 510A and the rear-side conveyor 510B. The second carrying conveyor 210' has a structure in which the front-side conveyor 510A is bent with respect to the rear-side conveyor 510B as illustrated in FIG. 16B when being placed on the truck 900. As a result, the end portion of the second carrying conveyor 210' can be prevented from exceeding the height limit T. Here, the +Y end portion of the front-side conveyor 510A is connected to a hinge provided at the upper end portion of the support member 302 and can transition between the state of FIG. 16A and the bent state of FIG. 16B by the expansion/contraction operation of a jack 300. That is, a function as a changing mechanism for changing the height of the end portion (chute portion 512) of the second carrying conveyor 210' is realized by the jack 300 and the front-side conveyor 510A. Stated differently, the changing mechanism bends the belt conveyor.

Figure 16A:
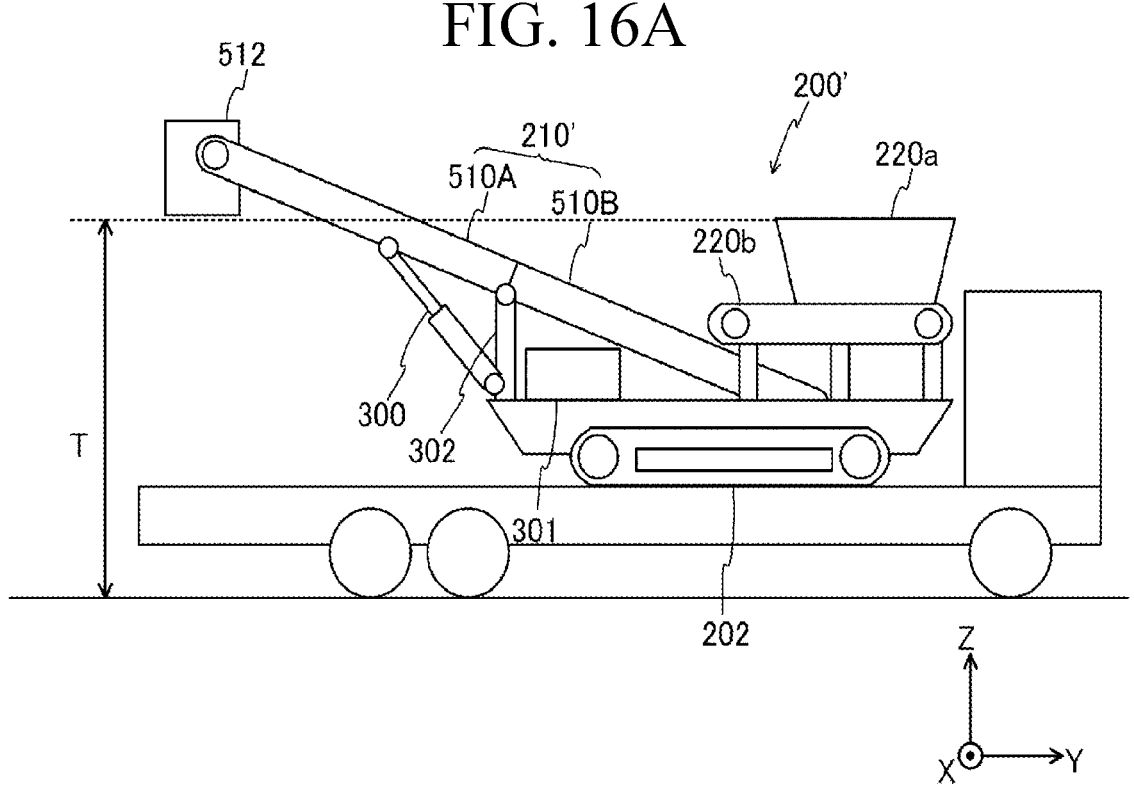
FIGS. 16A and 16B are views for explaining Modification Example 1.
Figure 16B:
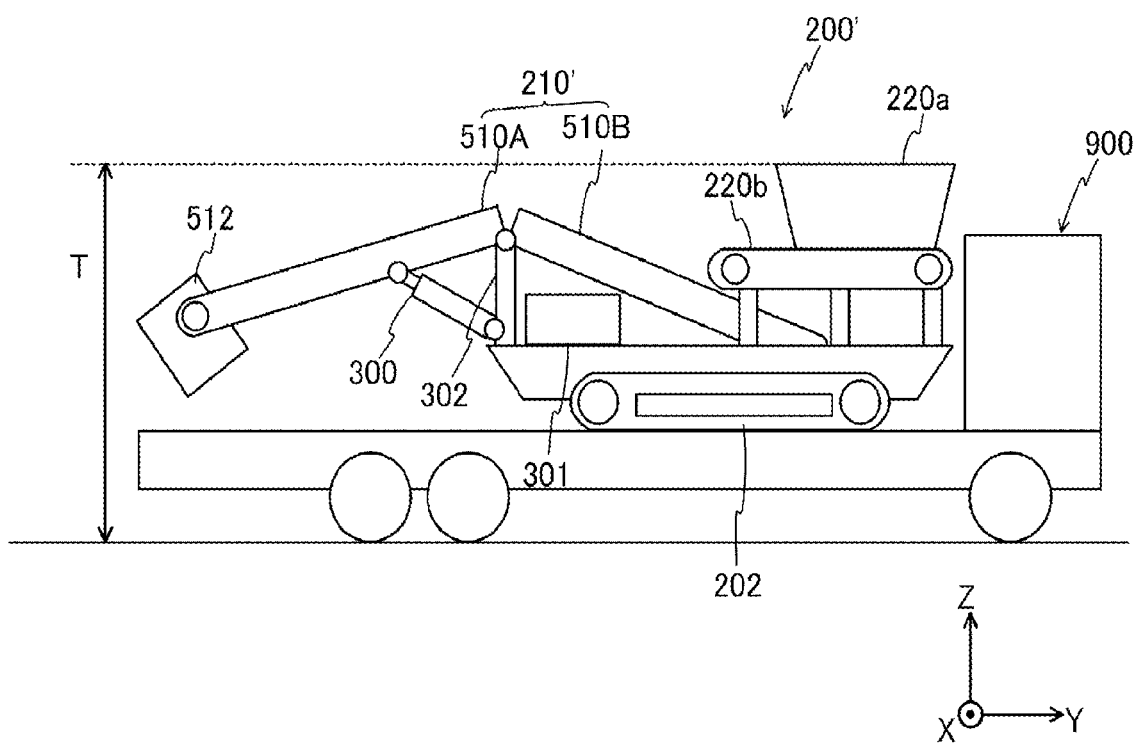

In FIGS. 16A and 16B, the case where the second carrying conveyor 210' includes the front-side conveyor 510A and the rear-side conveyor 510B has been described, but the present invention is not limited thereto. For example, the second carrying conveyor 210' may have the same configuration as the second carrying conveyor 210 of the above embodiment, and a changing mechanism for changing the inclination angle of the second carrying conveyor 210' may be provided.

Modification Example 2

Next, Modification Example 2 will be described with reference to FIGS. 17A to 24. In the present Modification Example 2, an example in which the second base material supply device 200' described in Modification Example 1 is adopted as the second base material supply device has been described, but the second base material supply device may be the second base material supply device 200 of the above embodiment.

Figure 17A:
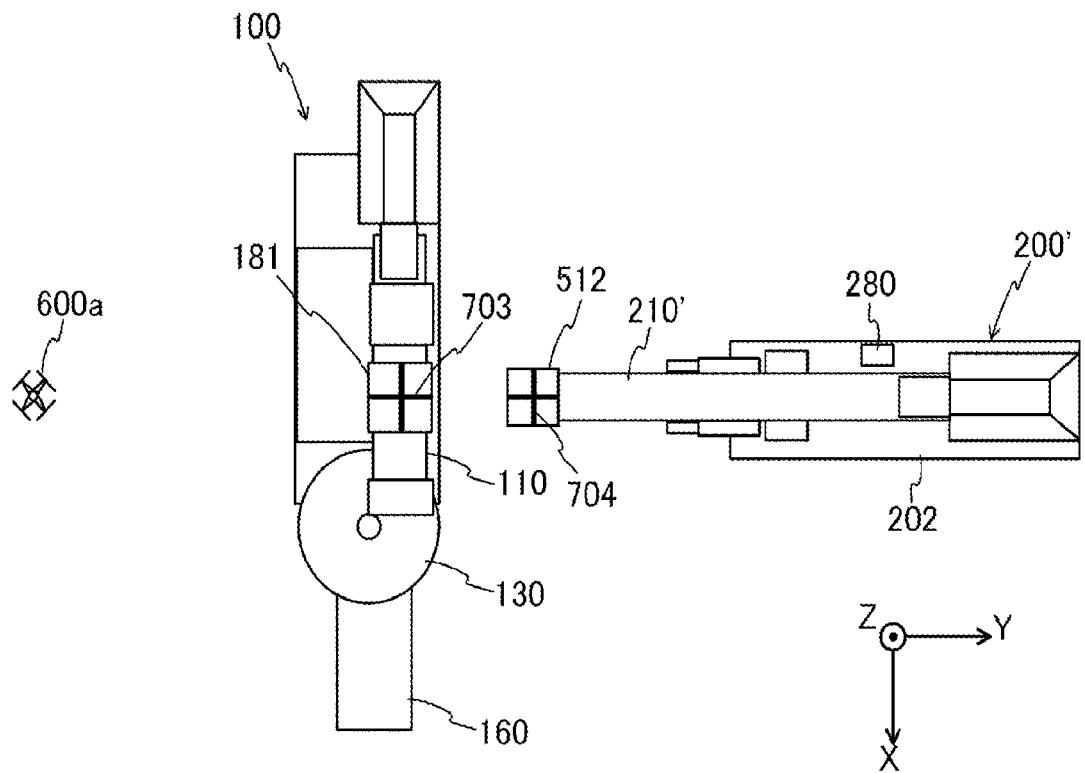
FIG. 17A is a view illustrating a state where a first device and a second base material supply device according to Modification Example 2 are viewed from a +Z direction.
Figure 17B:
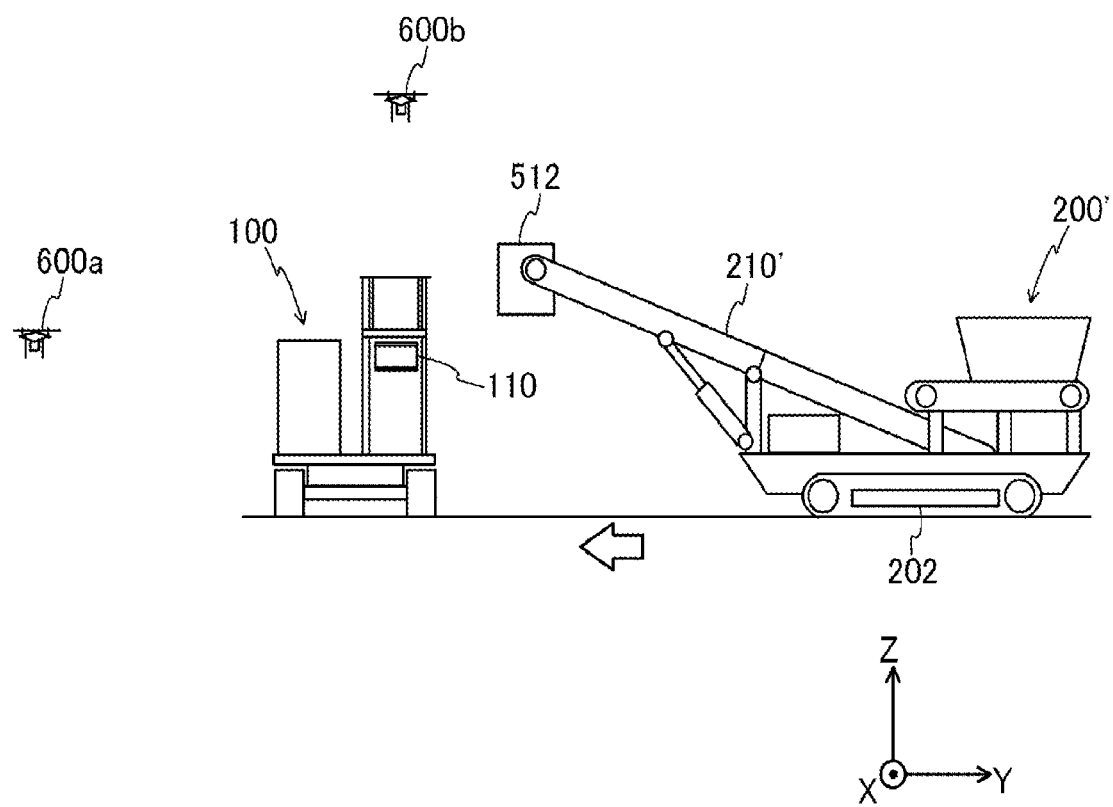
FIG. 17B is a view illustrating a state where a first device and a second base material supply device according to Modification Example 2 are viewed from a +X direction.

In Modification Example 2, the operation in which the second base material supply device 200 approaches the first device 100 is automatically controlled. In this automatic control, a first flight vehicle 600a and a second flight vehicle 600b are used as illustrated in FIGS. 17A and 17B. FIG. 17A illustrates a state where the first device 100 and the second base material supply device 200' are viewed from the +Z direction, and FIG. 17B illustrates a state where the first device 100 and the second base material supply device 200' are viewed from the +X direction. The second flight vehicle 600b is omitted in FIG. 17A for convenience of illustration. The first and second flight vehicles 600a and 600b are, for example, drones, and an imaging unit (camera) is mounted on a part thereof. The camera mounted on the first flight vehicle 600a images the first device 100 and the second base material supply device 200' from the −Y direction, and the camera mounted on the second flight vehicle 600b images the first device 100 and the second base material supply device 200' from the +Z direction. The image captured by each camera is transmitted to the control unit 280 (refer to FIG. 17A) of the second base material supply device 200. Then, the control unit 280 grasps the positional relationship between the first device 100 and the second base material supply device 200' based on the acquired image, and outputs an operation instruction to the second moving device 202.

Figure 18:
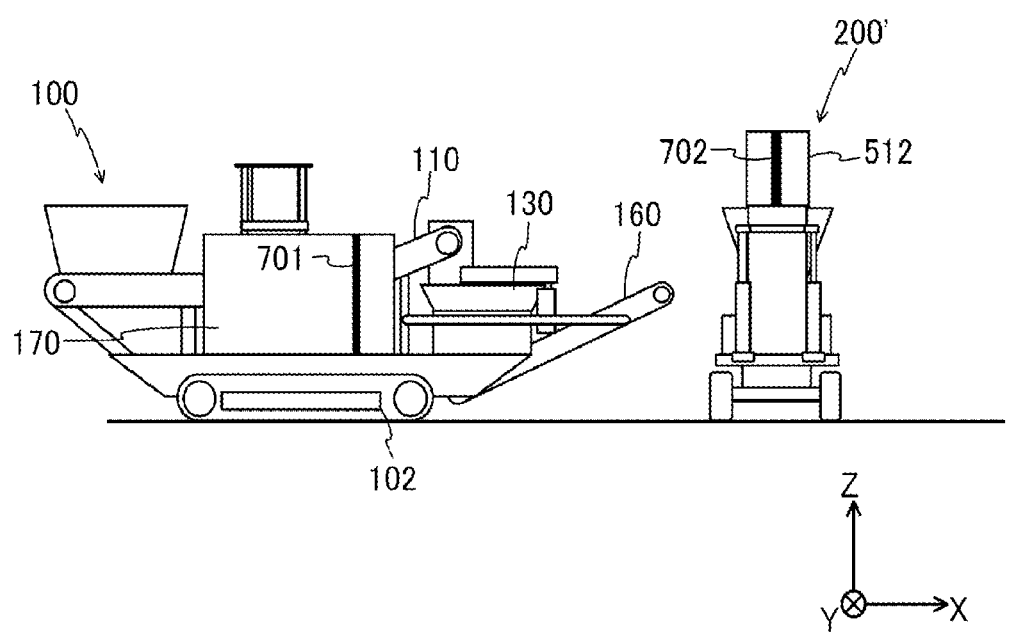
FIG. 18 is a view illustrating a state where the first device and the second base material supply device according to Modification Example 2 are viewed from a −Y direction.

FIG. 18 illustrates a state where the first device 100 and the second base material supply device 200' are viewed from the −Y direction. As illustrated in FIG. 18, a linear first mark 701 extending in the Z direction is provided on the surface on the −Y side of the generator 170 of the first device 100, and a linear second mark 702 extending in the Z direction is provided on the surface on the −Y side of the chute portion 512 of the second base material supply device 200'. A case where the positions of first mark 701 and second mark 702 in the Y-axis direction coincide with each other, means that the positions of chute portion 512 and the second position P2 (refer to FIG. 1 and the like) at which the second base material of first device 100 is supplied in the Y-axis direction coincide with each other.

As illustrated in FIG. 17A, a plate-shaped member 181 on which a cross-shaped third mark 703 is displayed is placed on the first carrying conveyor 110 of the first device 100. Furthermore, a cross-shaped fourth mark 704 is provided on the surface on the +Z side of the chute portion 512 of the second base material supply device 200'. The third mark 703 is larger than the fourth mark 704. The plate-shaped member 181 is placed on the first carrying conveyor 110 only when the automatic control is performed to bring the second base material supply device 200' close to the first device 100.

Next, processing by the control unit 280 when the second base material supply device 200' is positioned at the second position P2 will be described with reference to the flowchart of FIG. 19. As a premise to start the process of FIG. 19, it is assumed that the control unit 280 has started the flight of the first and second flight vehicles 600a and 600b. The control unit 280 then positions the first flight vehicle 600a such that the camera of first flight vehicle 600a can image the first mark 701, and the control unit 280 positions the second flight vehicle 600b such that the camera of second flight vehicle 600b can image the third mark 703 (refer to FIG. 17B). As illustrated in FIG. 17A, the first device 100 and the second base material supply device 200' are positioned at positions away from each other in the Y-axis direction.

Figure 19:
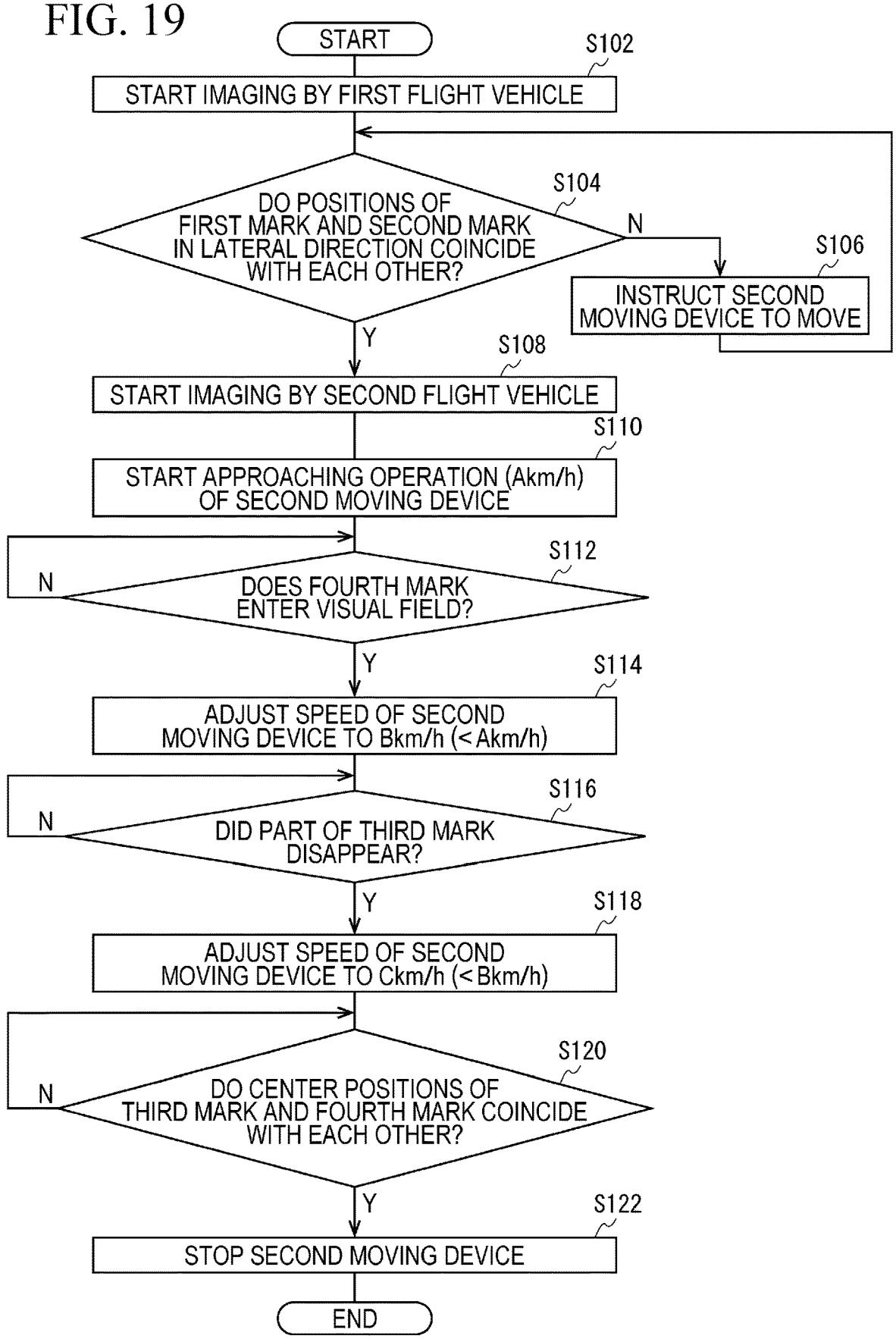
FIG. 19 is a flowchart illustrating processing of a control unit when a second base material supply device according to Modification Example 2 is positioned at a second position.

When the processing of FIG. 19 is started, first, in step S102, the control unit 280 starts imaging by the first flight vehicle 600a. In this case, for example, the camera of the first flight vehicle 600a images the inside of a visual field (angle of view) Fa indicated by a broken line in FIG. 20A. The first flight vehicle 600a transmits a captured image to the control unit 280.

Figure 20A:
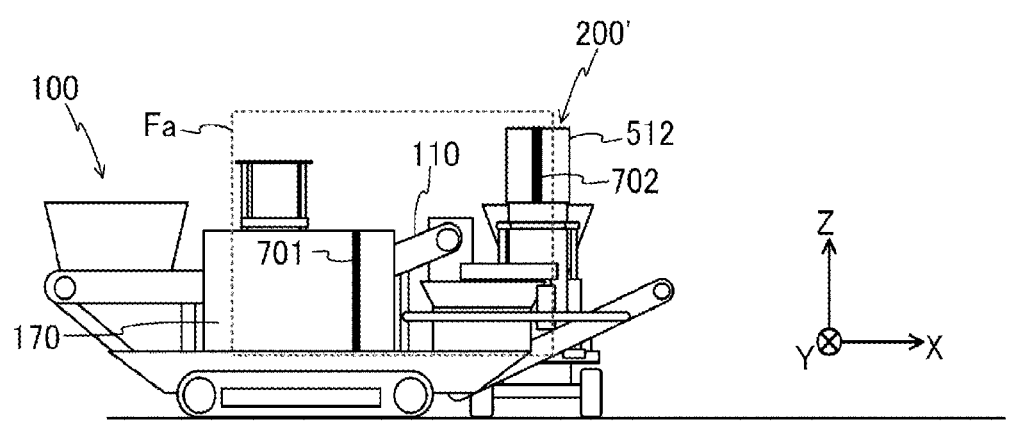
FIGS. 20A and 20B are views for explaining the processing of FIG. 19.

Next, in step S104, the control unit 280 determines whether or not the lateral positions (positions in the X-axis direction) of the first mark 701 and the second mark 702 coincide with each other. In the case of FIGS. 20A, because the positions do not coincide with each other, the determination in step S104 is negative. The process then proceeds to step S106.

When the process proceeds to step S106, the control unit 280 instructs the second moving device 202 to move. In this case, an approximate shift amount is calculated from the image, and an instruction is issued to the second moving device 202 to move in the X-axis direction. Thereafter, the process returns to step S104.

Figure 20B:
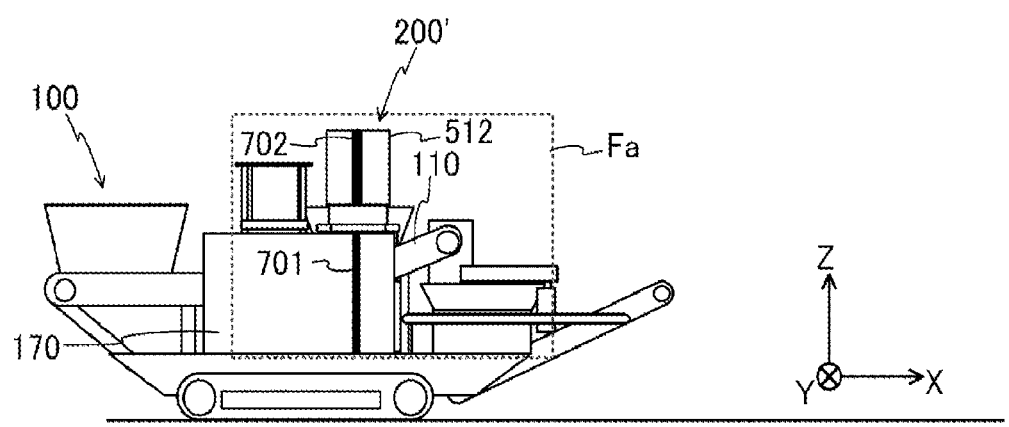
Figure 21A:
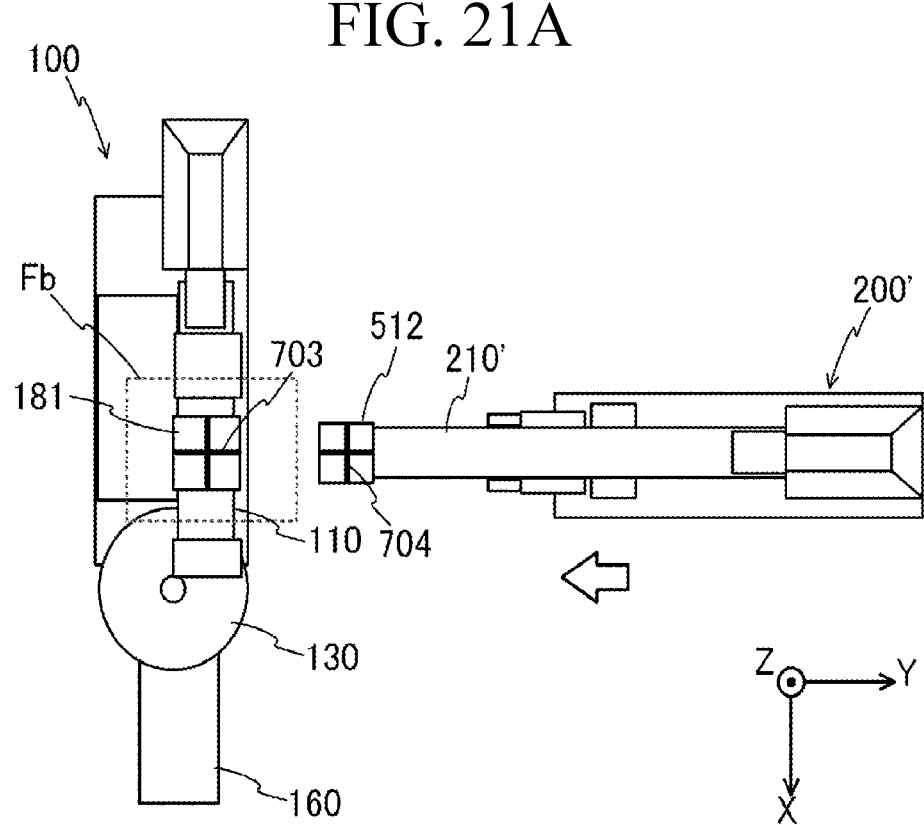
FIGS. 21A and 21B are views for explaining the processing of FIG. 19.

On the other hand, when the determination in step S104 is positive, the process proceeds to step S108. In the step of proceeding to step S108, the positional relationship between the first device 100 and the second base material supply device 200' is as illustrated in FIG. 20B from the −Y direction and is as illustrated in FIG. 21A from the +Z direction. When the process proceeds to step S108, the control unit 280 starts imaging by the second flight vehicle 600b. In this case, for example, the camera of the second flight vehicle 600b images the inside of a visual field Fb indicated by a broken line in FIG. 21A. The second flight vehicle 600b transmits the captured image to the control unit 280.

Next, in step S110, the control unit 280 starts an approaching operation (A km/h, for example, 2 km/h) of the second moving device 202 (refer to a white arrow in FIG. 21A).

Figure 21B:
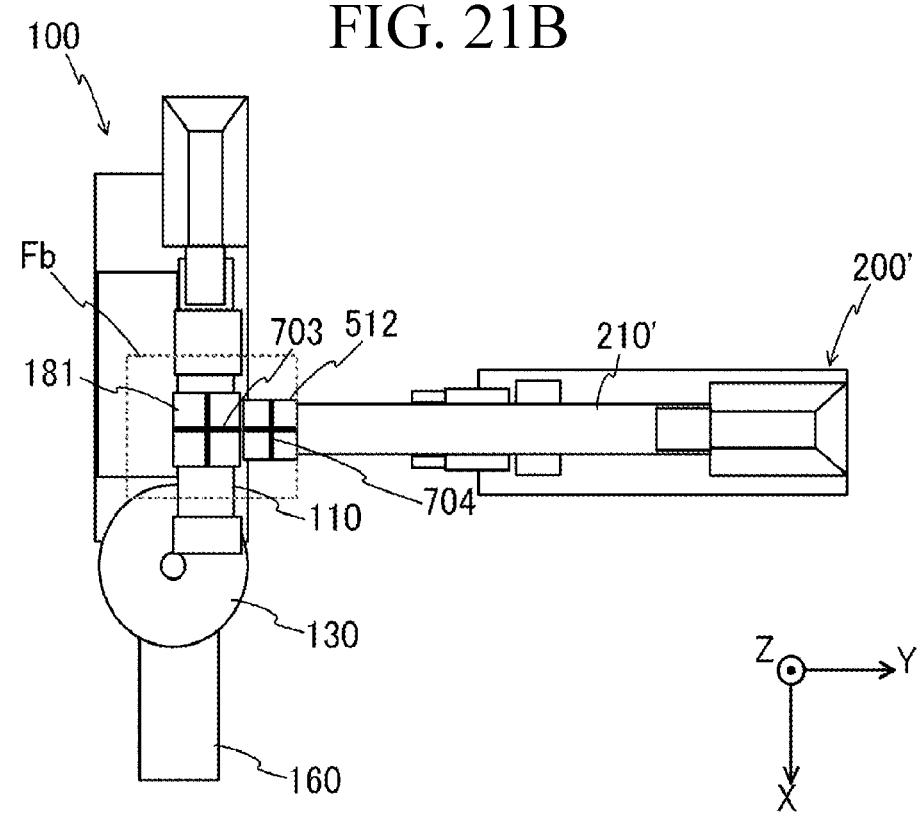

Next, in step S112, the control unit 280 waits until the fourth mark 704 enters the visual field Fb. In this case, the control unit 280 determines whether or not two cross-shaped marks have entered the visual field Fb using a predetermined image processing technique. As illustrated in FIG. 21B, when the fourth mark 704 enters the visual field Fb, the control unit 280 proceeds to step S114.

When the process proceeds to step S114, the control unit 280 adjusts the speed of the second moving device 202 to a speed of B km/h (<A km/h). The speed B km/h is, for example, 1 km/h.

Figure 22A:
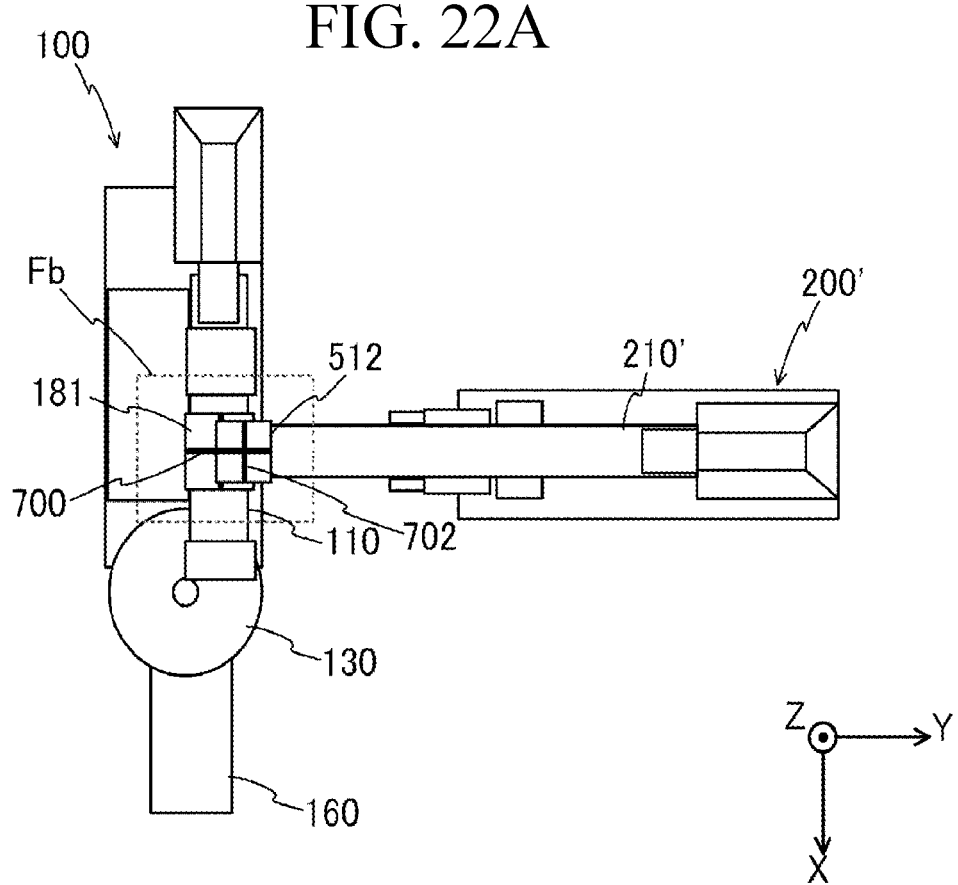
FIGS. 22A and 22B are views for explaining the processing of FIG. 19.
Figure 22B:
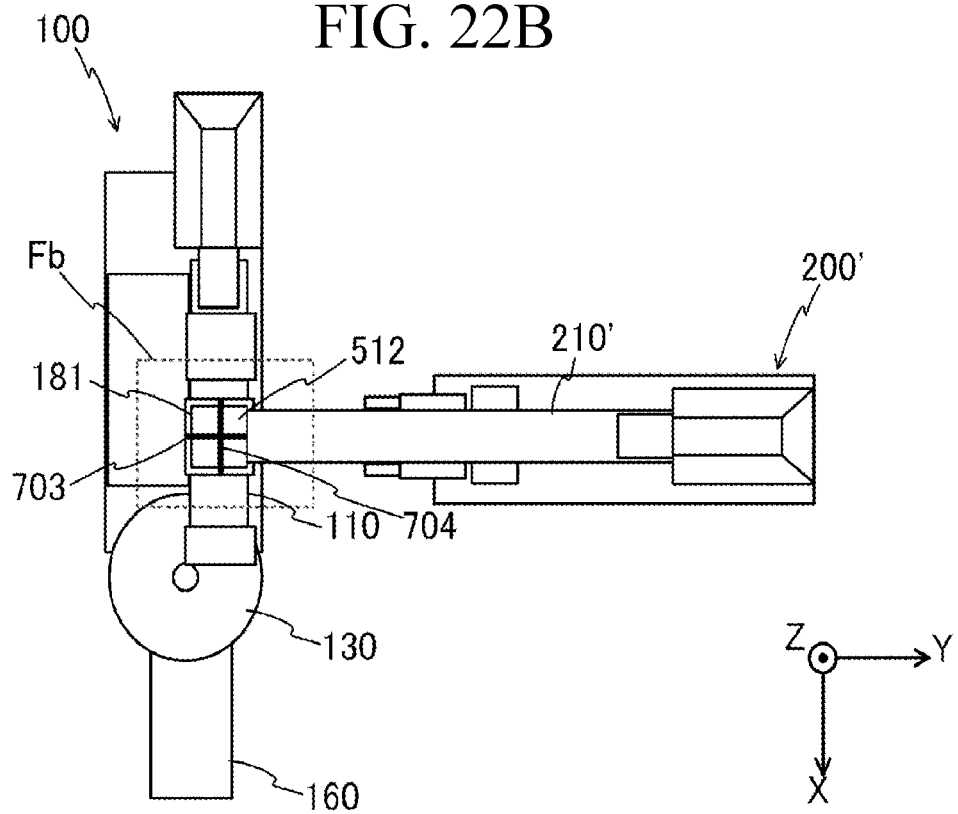

Next, in step S116, the control unit 280 waits until a part of the third mark 703 disappears. In this case, for example, the control unit 280 determines whether or not one of the intersections of the two cross-shaped marks existing immediately before cannot be imaged. As illustrated in FIG. 22A, when the intersection of the third mark 703 is hidden by the chute portion 512 and becomes invisible, the control unit 280 proceeds to step S118.

When the process proceeds to step S118, the control unit 280 adjusts the speed of the second moving device 202 to a speed of C km/h (<B km/h). The speed C km/h is a speed at which the second moving device 202 can immediately stop and is, for example, 0.5 km/h.

Next, in step S120, the control unit 280 waits until the center positions of the third mark 703 and the fourth mark 704 coincide with each other. In this case, as illustrated in FIG. 21B, at a stage where the line extending in the X-axis direction of the third mark 703 and the line extending in the X-axis direction of the fourth mark 704 coincide with each other (continuous stage), the control unit 280 proceeds to step S122.

When the process proceeds to step S122, the control unit 280 stops the second moving device 202. As a result, the second base material supply device 200' can be positioned at the second position P2.

As described above, according to the present Modification Example 2, the first and third marks 701 and 703 are provided in a predetermined positional relationship with respect to the first carrying conveyor 110, and the second and fourth marks 702 and 704 are provided in a predetermined positional relationship with respect to the chute portion 512. Then, the control unit 280 outputs a control instruction to the second moving device 202 based on a result of imaging each mark. As a result, the second base material supply device 200' can be automatically positioned such that the second base material supply device 200' and the first device 100 have an appropriate positional relationship. In the present embodiment, the first and third marks 701 and 703 correspond to a first mark, and the second and fourth marks 702 and 704 correspond to a second mark.

Further, according to the present Modification Example 2, the second base material supply device 200' is positioned at the second position P2 by using the imaging results by the cameras mounted on the first and second flight vehicles 600a and 600b. As a result, because the first and second flight vehicles 600a and 600b can be cleared after positioning, the first and second flight vehicles 600a and 600b do not interfere with the work of the mixing device 1000. After the positioning, the first and second flight vehicles 600a and 600b can be used (diverted) at different sites.

In the above Modification Example 2, the case where the second moving device 202 is automatically controlled has been described. The present invention is not limited thereto, and the operator may operate the second moving device 202. In this case, the control unit 280 notifies the operator of the operation timing or the like by displaying (outputting) the operation information on a display visually recognizable by the operator such that the operator can perform the same operation as the operation described in the above Modification Example 2. In this case, the operator can easily position the second base material supply device 200' at the second position P2 by performing an operation based on the operation information.

Figure 23:
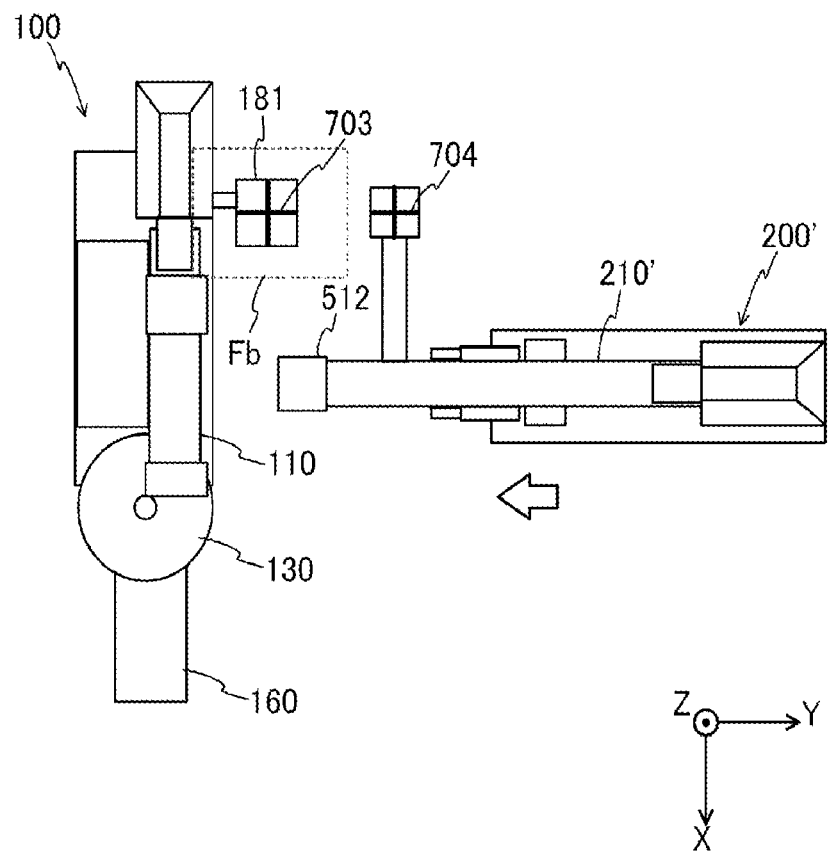
FIG. 23 is a view illustrating a modification example related to arrangement of third and fourth marks.

Further, in the above Modification Example 2, the case where the cameras are mounted on the first and second flight vehicles 600a and 600b has been described, but the present invention is not limited thereto. For example, the camera may be held by an arm provided in the first device 100 such that the camera can image the visual fields Fa and Fb. Each mark may not be provided at the position described in the above Modification Example 2. For example, the third and fourth marks 703 and 704 may be provided at positions as illustrated in FIG. 23. Even when the position of the mark is changed in this manner, processing similar to that in the above Modification Example 2 can be performed by adjusting the position of the camera in accordance with the position of the mark.

Figure 24:
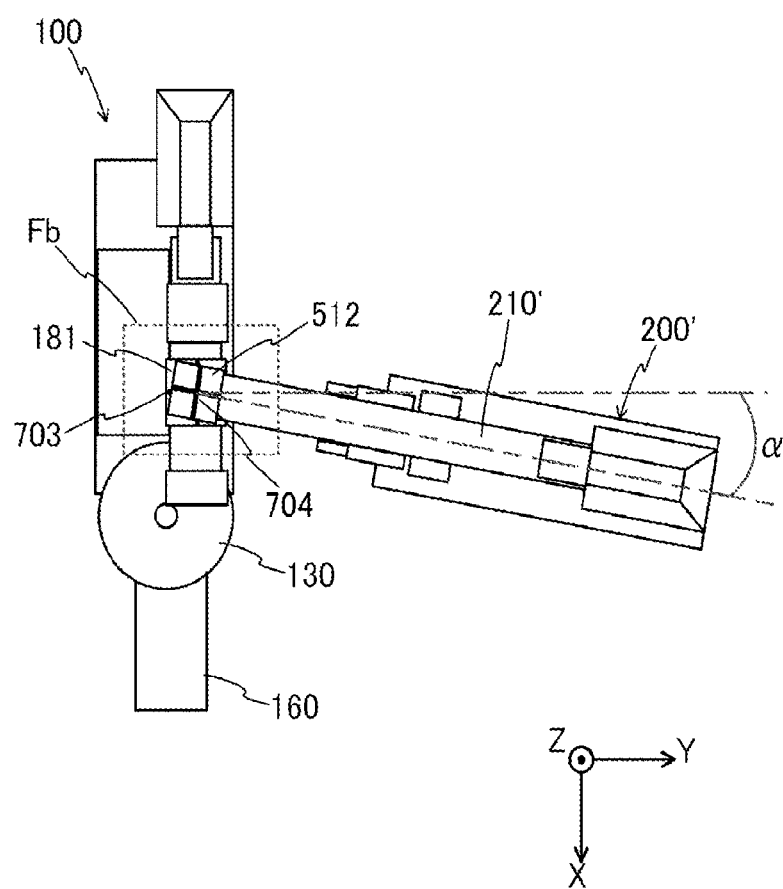
FIG. 24 is a view for explaining a shift in angle between the third and fourth marks.

In the processing of the above Modification Example 2, when the angle (the posture in the rotation direction about the Z axis) between the third mark 703 and the fourth mark 704 falls within the allowable range, it may be regarded that there is no problem. For example, as illustrated in FIG. 24, even in a case where there is a shift of an angle α between the third mark 703 and the fourth mark 704, when a is within +15°, it can be regarded that positioning is successful, and therefore, the positioning of the mixing device 1000 can be facilitated and the positioning time can be shortened. The reason why the allowable range is set within +15° is that when the allowable range is exceeded, there is a concern that a part of the second base material spills from above the first carrying conveyor 110. However, the present invention is not limited thereto, and the allowable range may be within +10°, +5°, or the like. As the allowable range is reduced, the possibility that the second base material spills from above the first carrying conveyor 110 can be reduced.

In the above Modification Example 2, the case where the vehicle decelerates in three stages such as speed A km/h→speed B km/h→speed C km/h has been described. However, the present invention is not limited thereto, and the manner of deceleration can be appropriately changed.

In the above Modification Example 2, the case where the plate-shaped member 181 on which the third mark 703 is displayed is placed on the first carrying conveyor 110 has been described. The present invention is not limited thereto, and the third mark 703 may be directly written on the first carrying conveyor 110. In this case, before the processing of FIG. 19 is performed, the first carrying conveyor 110 is operated, and accordingly the position of the third mark 703 may coincide with the second position P2.

Modification Example 3

Figure 25A:
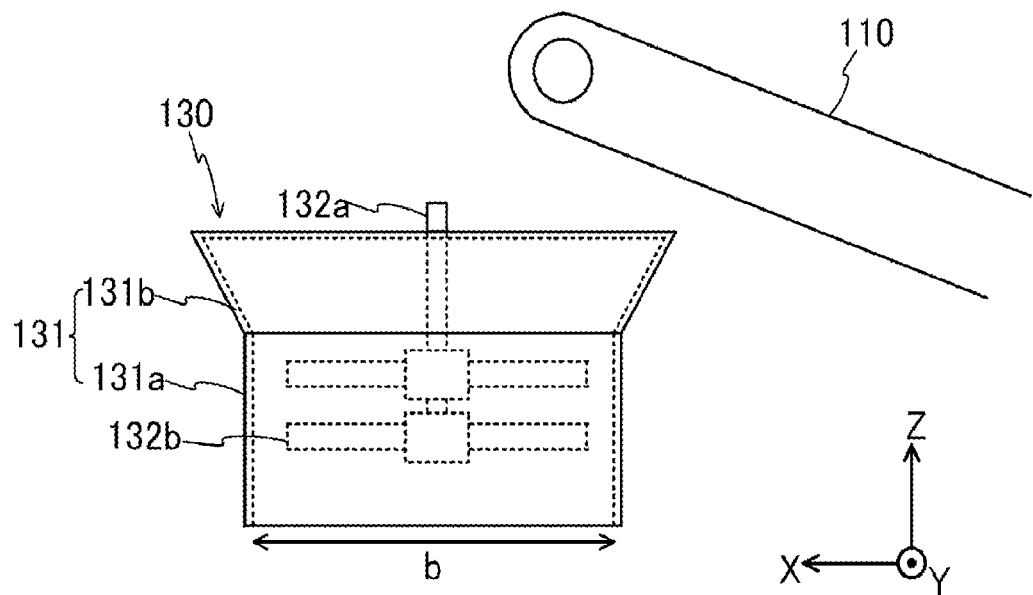
FIGS. 25A and 25B are views for explaining Modification Example 3.
Figure 25B:
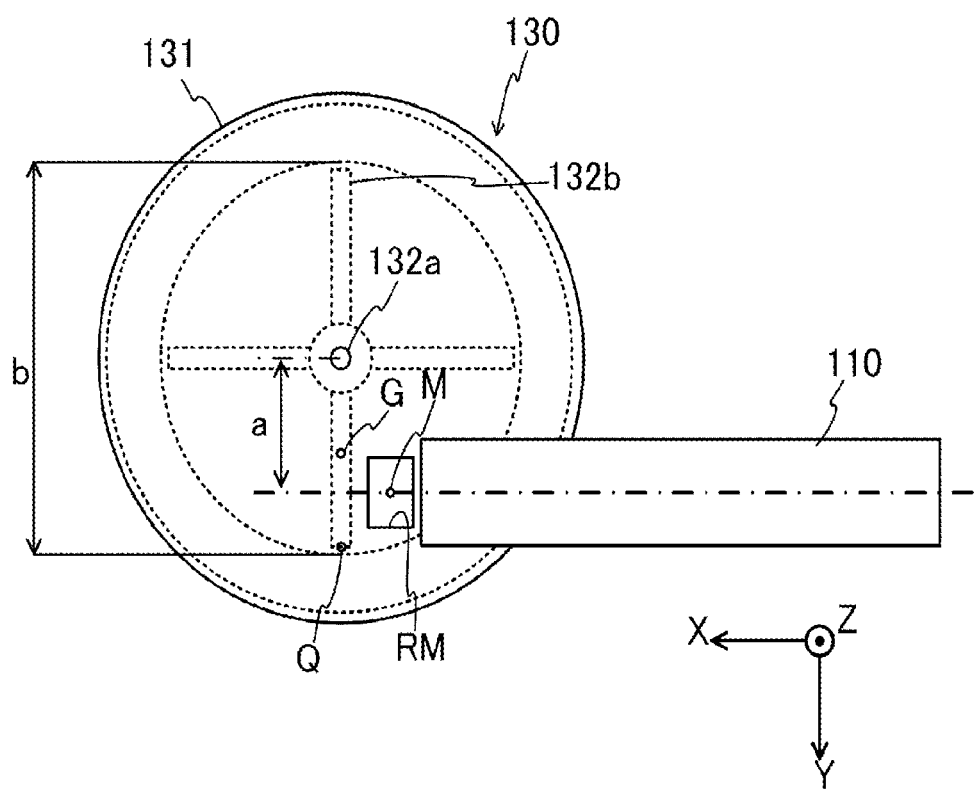

Next, Modification Example 3 will be described. FIG. 25A schematically illustrates a state where the vicinity of the mixing unit 130 is viewed from the +Y direction, and FIG. 25B schematically illustrates a state where the vicinity of the mixing unit 130 is viewed from the +Z direction. In the present Modification Example 3, the drum 131 of the mixing unit 130 includes a cylindrical housing or part 131a having a substantially constant diameter, and a tapered portion 131b provided at the upper end portion of the cylindrical part 131a and having a diameter increasing upward.

In the present Modification Example 3, as illustrated in FIG. 25B, when a shortest distance between a conveyance center of the first carrying conveyor 110 and a rotation center of the shaft member 132a is a, and an inner diameter of the cylindrical part 131a (e.g., of the inner peripheral surface) of the drum 131 is b, a value of a/b×100(%) is set to 20 to 60%, preferably 25 to 50%, and more preferably 30 to 40%. The reason why the range of a/b×100(%) is set in this manner is that when the range exceeds 60%, the adhesion of the raw material to the tapered portion 131b increases, which causes clogging in the drum 131, and when the range is less than 20%, a center M of a sediment input range RM does not pass between a center of gravity G and a tip end Q of the impact member 132b, such that the crushing efficiency decreases.

When the center of gravity G is positioned closer to the shaft member 132a than in FIG. 25, the value of a/b×100(%) may be set to 15 to 60%.

Others

In the above embodiment and each modification example, as the generator 170 of the first device 100 and the generator 301 of the second base material supply devices 200 and 200' (refer to FIG. 16A), a generator using renewable energy such as a fuel cell, a generator by an ammonia mixed combustion engine, or a solar power generator can be used. As a result, the environmental load can be reduced.

In addition, in the above-described embodiment and each modification example, a common component can be used as a component having the same function. For example, the first base material supply unit 120 provided in the first device 100 and the second base material supply unit 220 of the second base material supply device 200 and 200' can be a common component. In addition, the first moving device 102 of the first device 100 and the second moving device 202 of the second base material supply device 200 and 200' can be a common component. In this manner, the number of types of components can be reduced.

A list of reference signs used in the drawings and specification are listed below.
100 First device
101 First support member
102 First moving device
110 First carrying conveyor
120 First base material supply unit
130 Mixing unit
131 Drum (housing)
132 Rotating member
132a Shaft member
132b Impact member
140 Additive supply unit
150 First weighing unit
160 Discharge conveyor
170 Generator
180 Third weighing unit
190 Control unit
191 Input unit
200 Second base material supply device
201 Second support member
202 Second moving device
210 Second carrying conveyor
220 Second base material supply unit
250 Second weighing unit
CW110 Conveyance center line
CW101 Center line of first support member in Y direction
CL101 Center point (center line) of first support member in X direction
AX132 Rotation axis
131b Tapered portion
300 Jack (changing mechanism)
301 Generator
701 First mark (first mark)
702 Second mark (second mark)
703 Third mark (first mark)
704 Fourth mark (second mark)
600a, 600b (Flight vehicle, imaging unit)
280 Control unit (processing unit)

The invention claimed is:

1. A positioning method for positioning a first device and a second device separated from the first device includes the steps of:
   moving the second device so as to approach the first device;
   imaging a first mark on the first device and a second mark on the second device, the first mark and the second mark extending along a first direction and a second direction different from the first direction and the imaging being performed from a third direction that is different from the first and the second directions;
   outputting information based on the imaging of the first mark and the second mark; and
   stopping movement of the second device when a displacement between the first mark and the second mark in a rotational direction is within an allowable range.

2. The positioning method of claim 1, wherein
   the first mark and the second mark extend along a first direction, and
   the imaging is performed from a second direction different from the first direction.

3. The positioning method of claim 1, further including decelerating a moving speed of the second device when the imaging of a portion of the first mark is blocked by the second device.

4. The positioning method of claim 1, wherein
the imaging is performed by an imaging unit disposed on a drone.

5. The positioning method of claim 1, wherein
the imaging is performed by imaging units on each of disposed on a plurality of drones.

6. The positioning method of claim 5, wherein
the plurality of drones performs the imaging at different heights.

7. The positioning method of claim 1, further including
decelerating a moving speed of the second device based on the imaging the first mark and the second mark.

8. The positioning method of claim 7, further including
decelerating the moving speed of the second device is performed multiple times.

9. The positioning method of claim 7, further including
stopping movement of the second device based on the imaging the first mark and the second mark.

10. The positioning method of claim 8, further including
stopping movement of the second device based on the imaging the first mark and the second mark.

11. The positioning method of claim 1, wherein
a size of the first mark and a size of the second mark are different.

12. The positioning method of claim 1, wherein
the information based on the imaging is transmitted to the second device.

13. The positioning method of claim 1, wherein
the second device is supplied with renewable energy.

14. The positioning method of claim 1, wherein
the first device is supplied with renewable energy.

15. The positioning method of claim 13, wherein
a common part is used for the first device and the second device.

16. A positioning method for positioning a first device and a second device separated from the first device includes the steps of:
moving the second device so as to approach the first device;
imaging a first mark on the first device and a second mark on the second device;
outputting information based on the imaging of the first mark and the second mark; and
supplying a base material to the first device by the second device, wherein the second device supplies the base material from above the first device.

17. The positioning method of claim 16, wherein
the supplying the base material is performed in a state of non-contact between the first and second devices.

18. The positioning method of claim 16, wherein the imaging is performed by an imaging unit disposed on a drone.

19. The positioning method of claim 16, further including stopping movement of the second device based on the imaging of the first mark and the second mark.

* * * * *